US007073890B2

(12) United States Patent
Cabal et al.

(10) Patent No.: US 7,073,890 B2
(45) Date of Patent: Jul. 11, 2006

(54) THERMALLY CONDUCTIVE THERMAL ACTUATOR AND LIQUID DROP EMITTER USING SAME

(75) Inventors: Antonio Cabal, Webster, NY (US); John A. Lebens, Rush, NY (US); Stephen F. Bond, Oakton, VA (US)

(73) Assignee: Eastman Kodak Company, Rochester, NY (US)

( * ) Notice: Subject to any disclaimer, the term of this patent is extended or adjusted under 35 U.S.C. 154(b) by 329 days.

(21) Appl. No.: 10/650,874

(22) Filed: Aug. 28, 2003

(65) Prior Publication Data

US 2005/0046672 A1 Mar. 3, 2005

(51) Int. Cl.
*B41J 2/04* (2006.01)
*H02N 1/10* (2006.01)

(52) U.S. Cl. ........................................ 347/54; 310/307

(58) Field of Classification Search .................. 347/54; 310/307

See application file for complete search history.

(56) References Cited

U.S. PATENT DOCUMENTS

| | | | | |
|---|---|---|---|---|
| 3,747,120 | A | 7/1973 | Stemme | |
| 3,946,398 | A | 3/1976 | Kyser et al. | |
| 4,296,421 | A | 10/1981 | Hara et al. | |
| 5,599,695 | A | 2/1997 | Pease et al. | |
| 5,771,882 | A | 6/1998 | Psaros et al. | |
| 5,870,007 | A | 2/1999 | Carr et al. | |
| 5,902,648 | A | 5/1999 | Naka et al. | |
| 6,067,797 | A | 5/2000 | Silverbrook | |
| 6,087,638 | A | 7/2000 | Silverbrook | |
| 6,180,427 | B1 | 1/2001 | Silverbrook | |
| 6,209,989 | B1 * | 4/2001 | Silverbrook | 347/54 |
| 6,213,589 | B1 * | 4/2001 | Silverbrook | 347/54 |
| 6,239,821 | B1 | 5/2001 | Silverbrook | |
| 6,243,113 | B1 | 6/2001 | Silverbrook | |
| 6,254,220 | B1 * | 7/2001 | Silverbrook | 347/54 |
| 6,254,793 | B1 | 7/2001 | Silverbrook | |
| 6,280,019 | B1 | 8/2001 | Giere et al. | |
| 6,274,056 | B1 | 9/2001 | Silverbrook | |
| 6,309,052 | B1 | 10/2001 | Prasad et al. | |
| 6,491,833 | B1 * | 12/2002 | Silverbrook | 216/27 |
| 6,561,627 | B1 | 5/2003 | Jarrold et al. | |
| 6,588,884 | B1 | 7/2003 | Furlani et al. | |
| 6,598,960 | B1 * | 7/2003 | Cabal et al. | 347/56 |
| 6,644,786 | B1 * | 11/2003 | Lebens | 347/54 |
| 6,793,974 | B1 * | 9/2004 | Mcavoy et al. | 427/445 |

(Continued)

FOREIGN PATENT DOCUMENTS

JP 20330543 1/1990

(Continued)

*Primary Examiner*—K. Feggins
*Assistant Examiner*—Rene Garcia, Jr.
(74) *Attorney, Agent, or Firm*—William R. Zimmerli

(57) ABSTRACT

A thermal actuator for a micro-electromechanical device is disclosed. The thermal actuator includes a base element and a movable element extending from the base element and residing at a first position. The movable element includes a barrier layer constructed of a barrier material having low thermal conductivity material, bonded between a first layer and a second layer; wherein the first layer is constructed of a first material having a high coefficient of thermal expansion and the second layer is constructed of a second material having a high thermal conductivity and a high Young's modulus. An apparatus is provided adapted to apply a heat pulse directly to the first layer, causing a thermal expansion of the first layer relative to the second layer and deflection of the movable element to a second position.

39 Claims, 19 Drawing Sheets

U.S. PATENT DOCUMENTS

| | | | | |
|---|---|---|---|---|
| 2002/0093548 | A1 * | 7/2002 | Jarrold et al. | 347/54 |
| 2003/0210300 | A1 * | 11/2003 | Silverbrook | 347/54 |
| 2004/0247237 | A1 * | 12/2004 | Chaparala et al. | 385/17 |

FOREIGN PATENT DOCUMENTS

| | | |
|---|---|---|
| WO | WO 02/32806 | 4/2002 |

* cited by examiner

THERMALLY CONDUCTIVE THERMAL ACTUATOR AND LIQUID DROP EMITTER USING SAME

FIELD OF THE INVENTION

The present invention relates generally to micro-electro-mechanical devices and, more particularly, to thermally actuated liquid drop emitters such as the type used for ink jet printing.

BACKGROUND OF THE INVENTION

Micro-electro mechanical systems (MEMS) are a relatively recent development. Such MEMS are being used as alternatives to conventional electro-mechanical devices as actuators, valves, and positioners. Micro-electromechanical devices are potentially low cost, due to use of microelectronic fabrication techniques. Novel applications are also being discovered due to the small size scale of MEMS devices.

Many potential applications of MEMS technology utilize thermal actuation to provide the motion needed in such devices. For example, many actuators, valves and positioners use thermal actuators for movement. In some applications the movement required is pulsed. For example, rapid displacement from a first position to a second, followed by restoration of the actuator to the first position, might be used to generate pressure pulses in a fluid or to advance a mechanism one unit of distance or rotation per actuation pulse. Drop-on-demand liquid drop emitters use discrete pressure pulses to eject discrete amounts of liquid from a nozzle.

Drop-on-demand (DOD) liquid emission devices have been known as ink printing devices in ink jet printing systems for many years. Early devices were based on piezoelectric actuators such as are disclosed by Kyser et al., in U.S. Pat. No. 3,946,398 and Stemme in U.S. Pat. No. 3,747,120. A currently popular form of ink jet printing, thermal ink jet (or "bubble jet"), uses electroresistive heaters to generate vapor bubbles which cause drop emission, as is discussed by Hara et al., in U.S. Pat. No. 4,296,421.

Electroresistive heater actuators have manufacturing cost advantages over piezoelectric actuators because they can be fabricated using well developed microelectronic processes. On the other hand, the thermal ink jet drop ejection mechanism requires the ink to have a vaporizable component, and locally raises ink temperatures well above the boiling point of this component. This temperature exposure places severe limits on the formulation of inks and other liquids that may be reliably emitted by thermal ink jet devices. Piezoelectrically actuated devices do not impose such severe limitations on the liquids that can be jetted because the liquid is mechanically pressurized.

The availability, cost, and technical performance improvements that have been realized by ink jet device suppliers have also engendered interest in the devices for other applications requiring micro-metering of liquids. These new applications include dispensing specialized chemicals for micro-analytic chemistry as disclosed by Pease et al., in U.S. Pat. No. 5,599,695; dispensing coating materials for electronic device manufacturing as disclosed by Naka et al., in U.S. Pat. No. 5,902,648; and for dispensing microdrops for medical inhalation therapy as disclosed by Psaros et al., in U.S. Pat. No. 5,771,882. Devices and methods capable of emitting, on demand, micron-sized drops of a broad range of liquids are needed for highest quality image printing, but also for emerging applications where liquid dispensing requires mono-dispersion of ultra small drops, accurate placement and timing, and minute increments.

A low cost approach to micro drop emission is needed which can be used with a broad range of liquid formulations. Apparatus and methods are needed which combines the advantages of microelectronic fabrication used for thermal ink jet with the liquid composition latitude available to piezo-electro-mechanical devices.

A DOD ink jet device which uses a thermo-mechanical actuator was disclosed by T. Kitahara in JP 2,030,543, filed Jul. 21, 1988. The actuator is configured as a bi-layer cantilever moveable within an ink jet chamber. The beam is heated by a resistor causing it to bend due to a mismatch in thermal expansion of the layers. The free end of the beam moves to pressurize the ink at the nozzle causing drop emission. Recently, K. Silverbrook in U.S. Pat. Nos. 6,067,797; 6,087,638; 6,239,821 and 6,243,113 has made disclosures of a similar thermo-mechanical DOD ink jet configuration. Methods of manufacturing thermo-mechanical ink jet devices using microelectronic processes have been disclosed by K. Silverbrook in U.S. Pat. Nos. 6,180,427; 6,254,793 and 6,274,056.

Thermo-mechanically actuated drop emitters employing a moving cantilevered element are promising as low cost devices which can be mass produced using microelectronic materials and equipment and which allow operation with liquids that would be unreliable in a thermal ink jet device. An alternate configuration of the thermal actuator, an elongated beam anchored within the liquid chamber at two opposing walls, is a promising approach when high forces are required to eject liquids having high viscosities.

However, operation of thermal actuator style drop emitters, at high drop repetition frequencies, requires careful attention to the effects of heat build-up. The drop generation event relies on creating a pressure impulse in the liquid at the nozzle. A significant rise in baseline temperature of the emitter device, and, especially, of the thermo-mechanical actuator itself, precludes system control of a portion of the available actuator displacement that can be achieved without exceeding maximum operating temperature limits of device materials and the working liquid itself Apparatus and methods of operation for thermo-mechanical DOD emitters are needed which manage the effects of heat in the thermo-mechanical actuator so as to maximize the productivity of such devices.

Configurations for movable element thermal actuators are needed which can be operated at high repetition frequencies and with maximum force of actuation, while reducing the amount of heat energy needed and improving the dissipation of heat between actuations.

SUMMARY OF THE INVENTION

It is therefore an object of the present invention to provide a thermal actuator using a moving element that can be operated at high repetition frequencies without excessive rise in baseline temperatures.

It is also an object of the present invention to provide a liquid drop emitter using a thermal actuator having a moving element that can be operated at high repetition frequencies without excessive rise in baseline temperatures.

The foregoing and numerous other features, objects and advantages of the present invention will become readily apparent upon a review of the detailed description, claims and drawings set forth herein. These features, objects and advantages are accomplished by constructing a thermal actuator for a micro-electromechanical device comprising a base element and a movable element extending from the base element and residing at a first position. The movable element includes a barrier layer constructed of a barrier material having low thermal conductivity material, bonded between a first layer and a second layer; wherein the first layer is constructed of a first material having a high coefficient of thermal expansion and the second layer is constructed of a second material having a high thermal conductivity and a high Young's modulus. An apparatus is provided adapted to apply a heat pulse directly to the first layer, causing a thermal expansion of the first layer relative to the second layer and deflection of the movable element to a second position, followed by relaxation of the movable element towards the first position as heat diffuses through the barrier layer to the second layer.

Liquid drop emitters of the present inventions are particularly useful in ink jet printheads for ink jet printing.

DETAILED DESCRIPTION OF THE INVENTION

The invention has been described in detail with particular reference to certain preferred embodiments thereof, but it will be understood that variations and modifications can be effected within the spirit and scope of the invention.

As described in detail herein below, the present invention provides apparatus a thermal actuator for a micromechanical device, for example a drop-on-demand liquid emission device. The most familiar of such devices are used as printheads in ink jet printing systems. Many other applications are emerging which make use of devices similar to ink jet printheads, however which emit liquids other than inks that need to be finely metered and deposited with high spatial precision. The terms ink jet and liquid drop emitter will be used herein interchangeably. The terms thermo-mechanical actuator and thermal actuator are also used interchangeable herein. The inventions described below provide thermal actuators and liquid drop emitters that are configured so as allow operation at reduced input heat energy and which more rapidly dissipate pulse heat energy to the substrate.

Figure 1:
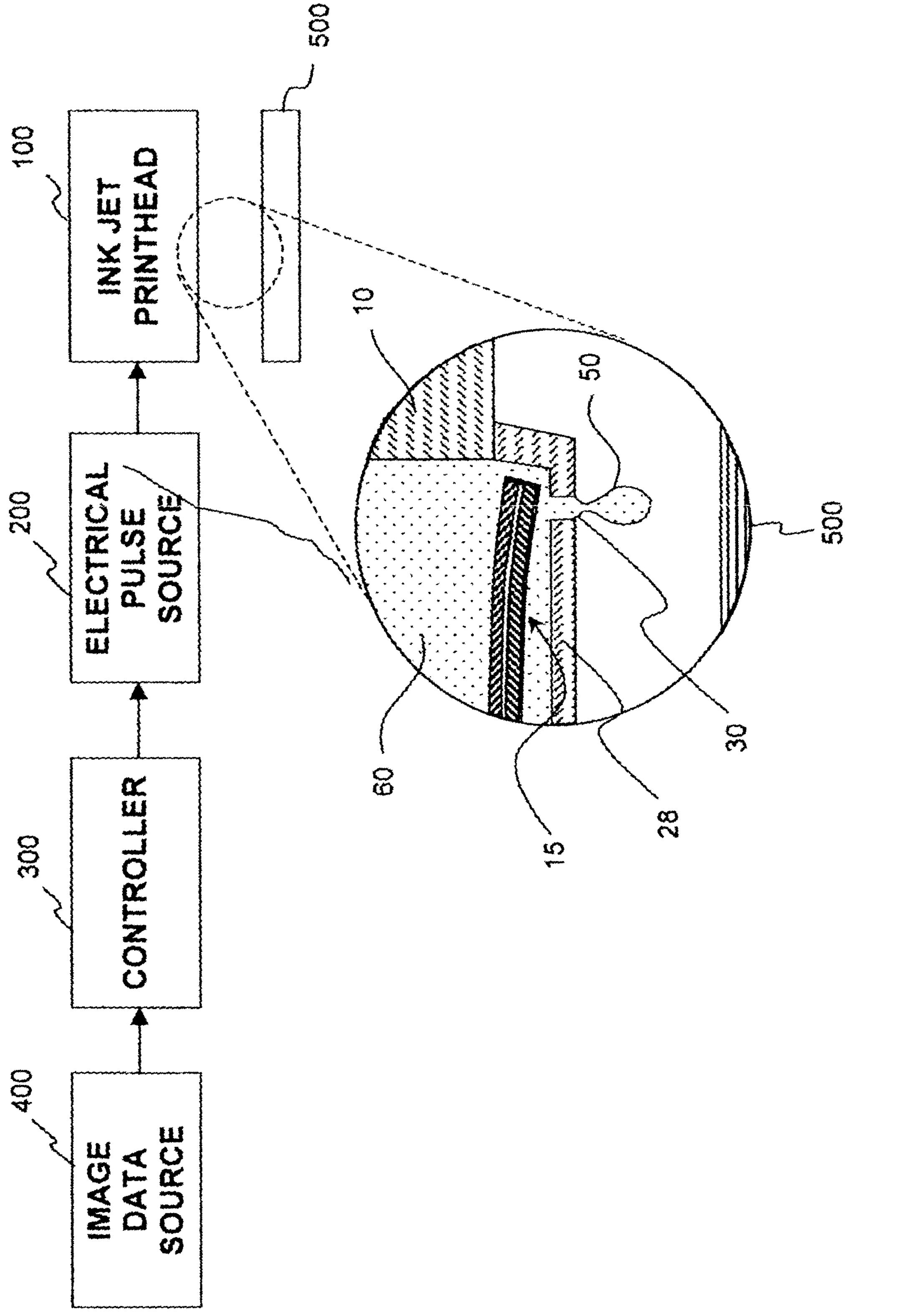
FIG. 1 is a schematic illustration of an ink jet system according to the present invention.

Turning first to FIG. 1, there is shown a schematic representation of an ink jet printing system which may use an apparatus and be operated according to the present invention. The system includes an image data source 400 that provides signals that are received by controller 300 as commands to print drops. Controller 300 outputs signals to a source of electrical pulses 200. Pulse source 200, in turn, generates an electrical voltage signal composed of electrical energy pulses which are applied to electrically resistive means associated with each thermo-mechanical actuator 15 within ink jet printhead 100. The electrical energy pulses cause a thermo-mechanical actuator 15 to rapidly bend, pressurizing ink 60 located at nozzle 30, and emitting an ink drop 50 which lands on receiver 500.

Figure 2:
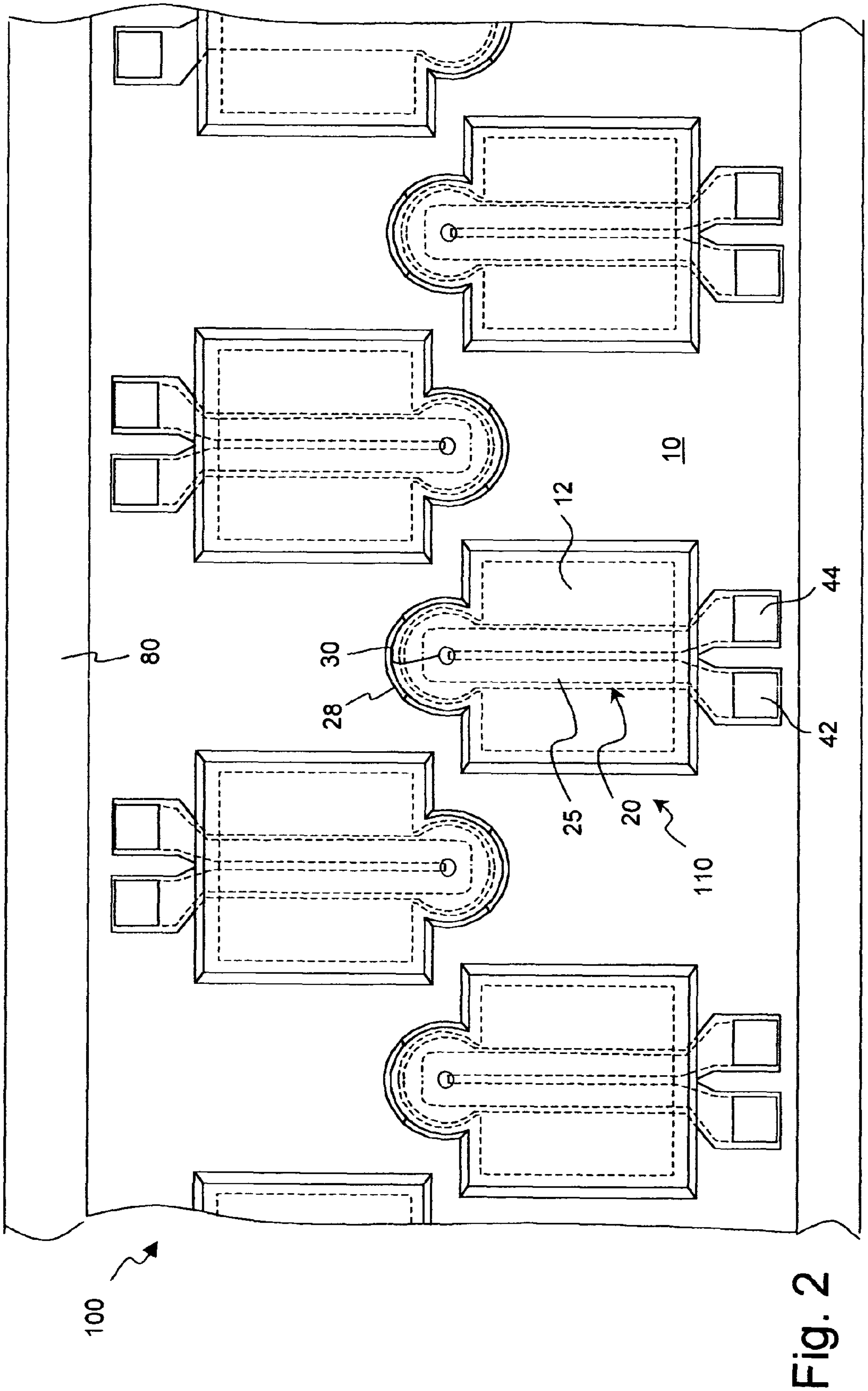
FIG. 2 is a plan view of a portion of an array of ink jet drop emitters.

FIG. 2 shows a plan view of a portion of ink jet printhead 100. An array of thermally actuated ink jet units 110 is shown having nozzles 30 centrally aligned, and ink chambers 12, interdigitated in two rows. The ink jet units 110 are formed on and in a substrate 10 using microelectronic fabrication methods. An example fabrication sequence which may be used to form drop emitters 110 is described in U.S. Pat. No. 6,561,627 for "Thermal Actuator," assigned to the assignee of the present invention.

Each drop emitter unit 110 has associated electrical lead contacts 42, 44 that are formed with, or are electrically connected to, a heater resistor portion 25, shown in phantom view in FIG. 2. In the illustrated embodiment, the heater resistor portion 25 is formed in a first layer of the thermal actuator 15 and participates in the thermo-mechanical effects as will be described. Element 80 of the printhead 100 is a mounting structure which provides a mounting surface for microelectronic substrate 10 and other means for interconnecting the liquid supply, electrical signals, and mechanical interface features.

Figure 3A:
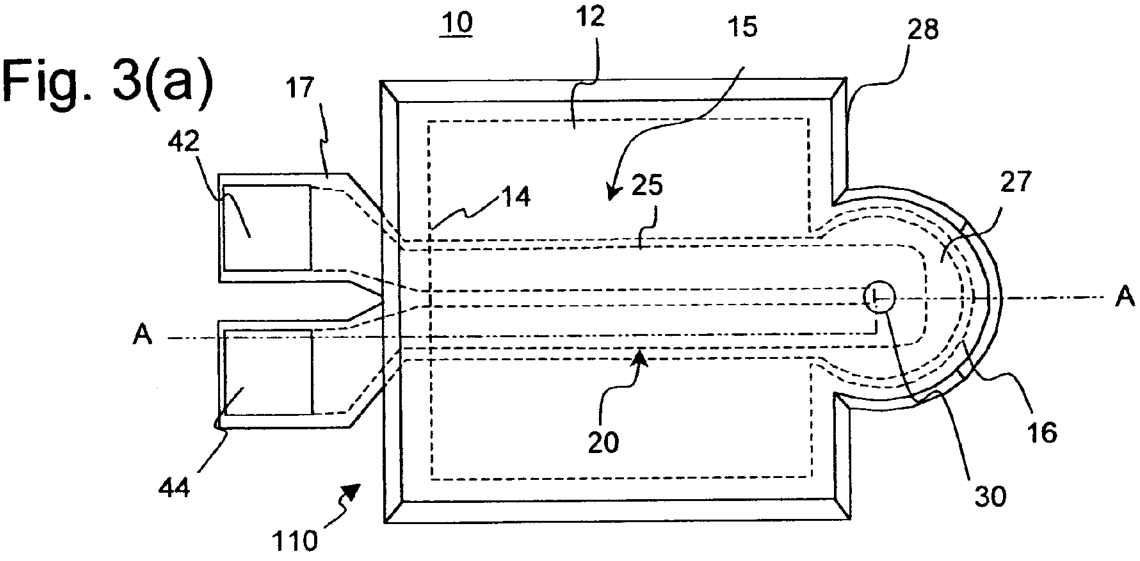
FIGS. 3(*a*) and (*b*) are enlarged plan views of an individual ink jet or liquid drop emitter unit according to the present invention.
Figure 3B:
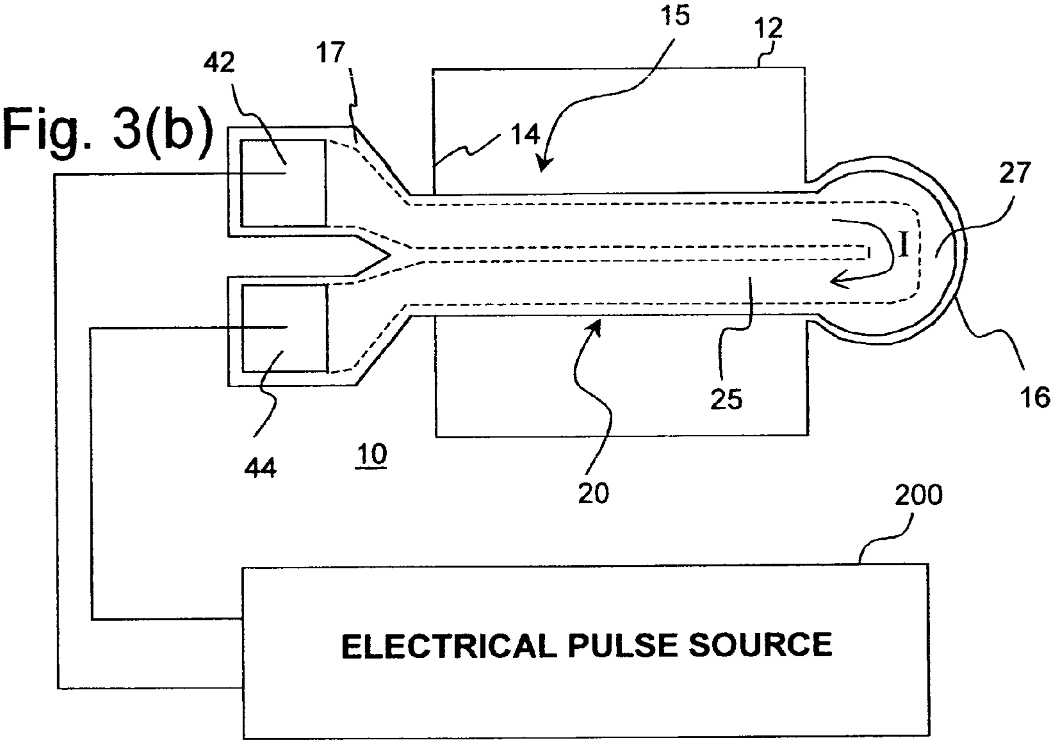

FIG. 3(*a*) illustrates a plan view of a single drop emitter unit 110 and a second plan view FIG. 3(*b*) with the liquid chamber cover 28, including nozzle 30, removed.

The thermal actuator 15, shown in phantom in FIG. 3(*a*) can be seen with solid lines in FIG. 3(*b*). The cantilevered element 20 of thermal actuator 15 extends from edge 14 of lower liquid chamber 12 which is formed in substrate 10. Cantilevered element anchor portion 17 is bonded to substrate 10 and anchors the cantilever.

The cantilevered element 20 of the actuator has the shape of a paddle, an extended flat shaft ending with a disc of larger diameter than the shaft width. This shape is merely illustrative of cantilever actuators that can be used, many other shapes are applicable. The paddle shape aligns the nozzle 30 with the center of the cantilevered element free end portion 27. The lower fluid chamber 12 has a curved wall portion at 16 which conforms to the curvature of the free end portion 27, spaced away to provide clearance for the actuator movement.

FIG. 3(*b*) illustrates schematically the attachment of electrical pulse source 200 to the resistive heater 25 at interconnect terminals 42 and 44. Voltage differences are applied to voltage terminals 42 and 44 to cause resistance heating via u-shaped resistor 25. This is generally indicated by an arrow showing a current I. In the plan views of FIG. 3, the actuator free end portion 27 moves toward the viewer when pulsed and drops are emitted toward the viewer from the nozzle 30 in cover 28. This geometry of actuation and drop emission is called a "roof shooter" in many ink jet disclosures.

Figure 4A:
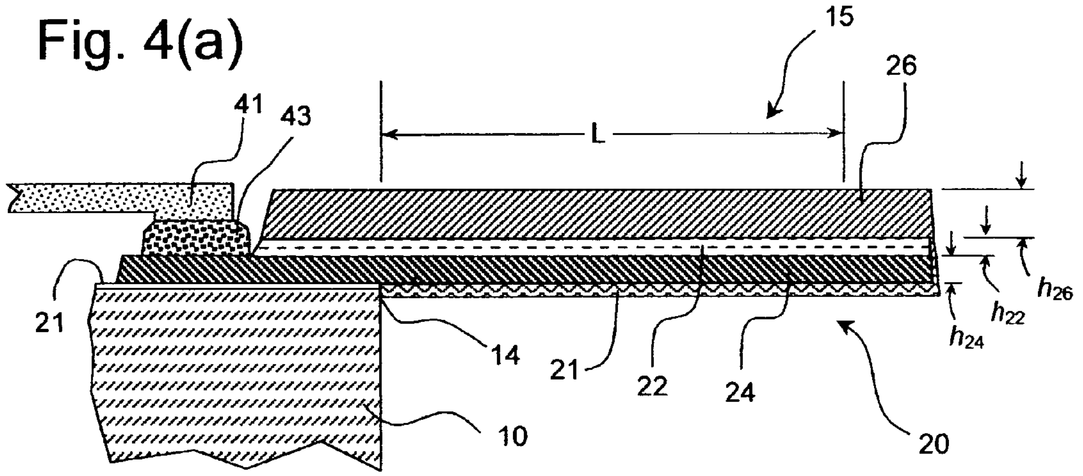
FIGS. 4(*a*) and 4(*b*) are side views formed along the line A—A in FIG. 3(*a*) illustrating first and second positions of the free end of a cantilevered element thermo-mechanical actuator according to the present invention.
Figure 4B:
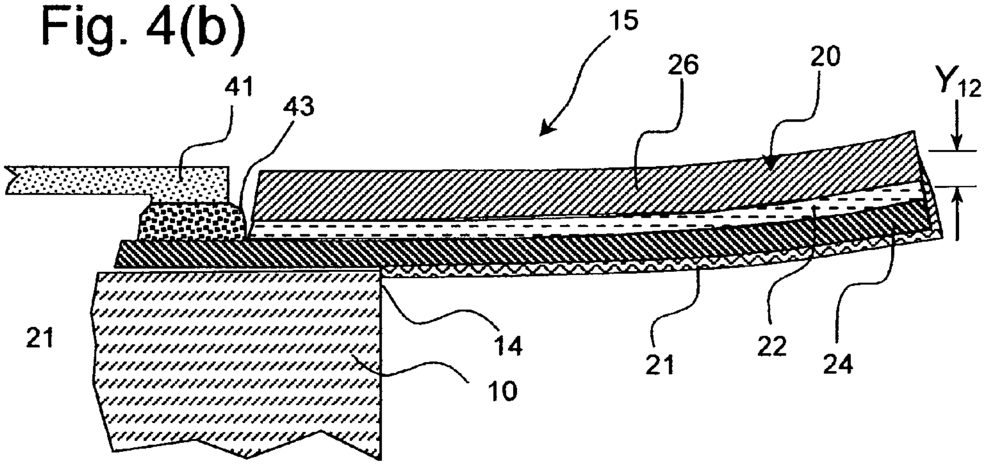

FIGS. 4(*a*) and 4(*b*) illustrate in side view a cantilevered thermal actuator 15 according to a preferred embodiment of the present invention. In FIG. 4(*a*) the actuator is in a first position and in FIG. 4(*b*) it is shown deflected upward to a second position. Cantilevered element 20 extends a length L from an anchor location 14 of base element 10 to the center of free end 27. The cantilevered element 20 is constructed of several layers. First layer 24 causes the upward deflection when it is thermally elongated with respect to other layers in the cantilevered element 20. It is constructed of a first material that has a large coefficient of thermal expansion. The first material may also be an electrically resistive material, for example, intermetallic titanium aluminide. First layer 24 has a thickness of $h_{24}$.

The cantilevered element 20 also includes a second layer 26, laminated with first layer 24. Second layer 26 is constructed of a second material having a low coefficient of thermal expansion, with respect to the material used to construct the first layer 24. The thickness and Young's modulus of second layer 26 is chosen to provide the desired mechanical stiffness and to maximize the deflection of the cantilevered element for a given input of heat energy. According to the present inventions, the second layer 26 material also has a high thermal conductivity so as to efficiently conduct heat energy along the movable element to the anchoring substrate. Second layer 26 has a thickness of $h_{26}$.

Second layer 26 may be composed of sub-layers, laminations of more than one material, so as to allow optimization of functions of heat flow management, electrical isolation, and strong bonding of the layers of the cantilevered element 20.

Passivation layer 21 shown in FIGS. 4(*a*) and 4(*b*) is provided to protect the first layer 24 chemically and electrically. Such protection may not be needed for some applications of thermal actuators according to the present invention, in which case it may be deleted. Liquid drop emitters utilizing thermal actuators which are touched on one or more surfaces by the working liquid may require passivation layer 21 which is chemically and electrically inert to the working liquid.

The cantilevered element 20 also includes a barrier layer 22, interposed between the first layer 24 and second layer 26. The barrier layer 22 is constructed of a material having a low thermal conductivity with respect to the thermal conductivity of the material used to construct the first layer 24. The thickness and thermal conductivity of barrier layer 22 is chosen to provide a desired time constant $\tau_B$ for heat transfer from first layer 24 to second layer 26. Barrier layer 22 may also be a dielectric insulator to provide electrical insulation for an electrically resistive heater element used to heat the deflector layer. In some preferred embodiments of the present invention, a portion of first layer 24 itself is configured as an electroresistor. For these embodiments barrier layer 22 may be used to insulate and partially define the electroresistor.

Barrier layer 22 may be composed of sub-layers, laminations of more than one material, so as to allow optimization of functions of heat flow management, electrical isolation, and strong bonding of the layers of the cantilevered element 20. Barrier layer 22 has a thickness of $h_{22}$.

A heat pulse is applied to first layer 24, causing it to rise in temperature and elongate. Second layer 26 does not elongate substantially because of its smaller coefficient of thermal expansion and the time required for heat to diffuse from first layer 24 into second layer 26 through barrier layer 22. The difference in length between first layer 24 and the second layer 26 causes the cantilevered element 20 to bend upward as illustrated in FIG. 4(*b*). The amount of deflection of the tip end from a first quiescent position to a second deflected position is noted as $Y_{12}$. When used as actuators in drop emitters, the bending response of the cantilevered element 20 must be rapid enough to sufficiently pressurize the liquid at the nozzle. Typically, electroresistive heating apparatus is adapted to apply heat pulses and an electrical pulse duration of less than 4 μsecs is used and, preferably, a duration less than 2 μsecs.

For the purposes of the description of the present inventions herein, cantilevered element 20 will be said to be quiescent or in its first position when the free end is not significantly changing in deflected position. For ease of understanding, the first position is depicted as horizontal in FIG. 4(*a*). However, operation of thermal actuators about a bent first position are known and anticipated by the inventors of the present invention and are fully within the scope of the present inventions.

FIGS. 5 through 10(*c*) illustrate fabrication processing steps for constructing a single liquid drop emitter according to some of the preferred embodiments of the present invention. For these embodiments the first layer 24 is constructed using an electrically resistive material, such as titanium aluminide, and a portion is patterned into a resistor for carrying electrical current, I.

Figure 5:
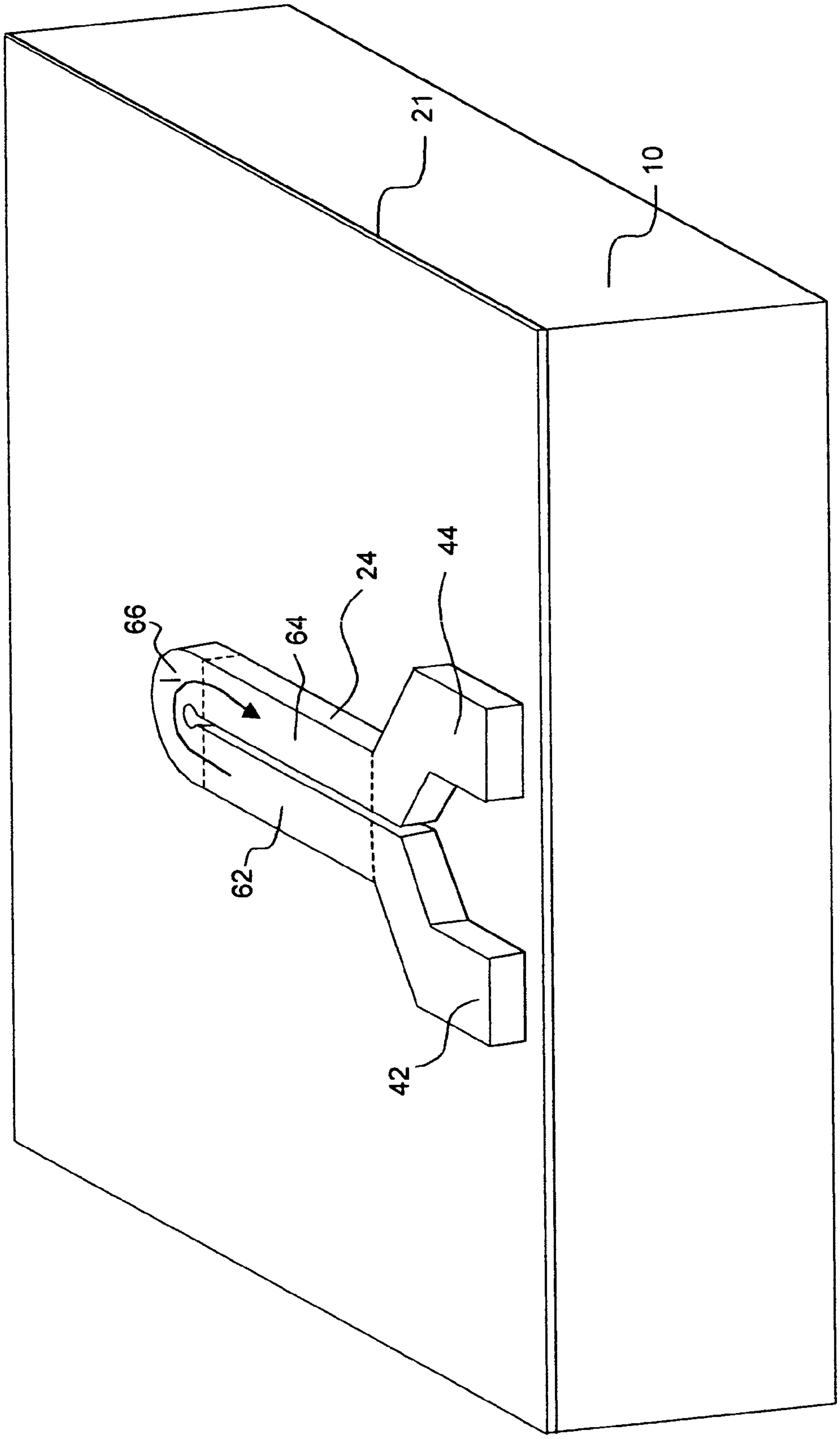
FIG. 5 is a perspective view of an initial process stage for constructing some preferred embodiments of a thermo-mechanical actuator according to the present invention wherein a first layer of an electrically resistive first material of the cantilevered element is formed over a passivation layer on a substrate.

FIG. 5 illustrates a first layer 24 of a cantilevered element in a first stage of fabrication. The illustrated structure is formed on a substrate 10, for example, single crystal silicon, by standard microelectronic deposition and patterning methods. A portion of substrate 10 will also serve as a base element from which cantilevered element 20 extends. Deposition of preferred first material intermetallic titanium aluminide may be carried out, for example, by RF or pulsed DC magnetron sputtering. An example deposition process that may be used for titanium aluminide is described in U.S. Pat. No. 6,561,627 for "Thermal Actuator," assigned to the assignee of the present invention. Titanium alumanide has a large coefficient of thermal expansion, $\alpha_{24}$~$15.5\times10^{-6}$/° K.

First layer 24 is deposited with a thickness of $h_{24}$. First and second resistor segments 62 and 64 are formed in first layer 24 by removing a pattern of the electrically resistive material. In addition, a current coupling segment 66 is formed in the first material which conducts current serially between the first resistor segment 62 and the second resistor segment 64. An arrow and letter "I" indicate the current path. Current coupling segment 66, formed in the electrically resistive material, will also heat the cantilevered element when conducting current. However this coupler heat energy, being introduced at the tip end of the cantilever, is not important or necessary to the deflection of the thermal actuator. The primary function of coupler segment 66 is to reverse the direction of current.

Addressing electrical leads 42 and 44 are illustrated as being formed in the first layer 24 material as well. Leads 42, 44 may make contact with circuitry previously formed in base element substrate 10 or may be contacted externally by other standard electrical interconnection methods, such as tape automated bonding (TAB) or wire bonding. A passivation layer 21 may be formed on substrate 10 before the deposition and patterning of the first layer 24 material. This passivation layer may be left under first layer 24 and other subsequent structures or removed in a subsequent patterning process.

Figure 6:
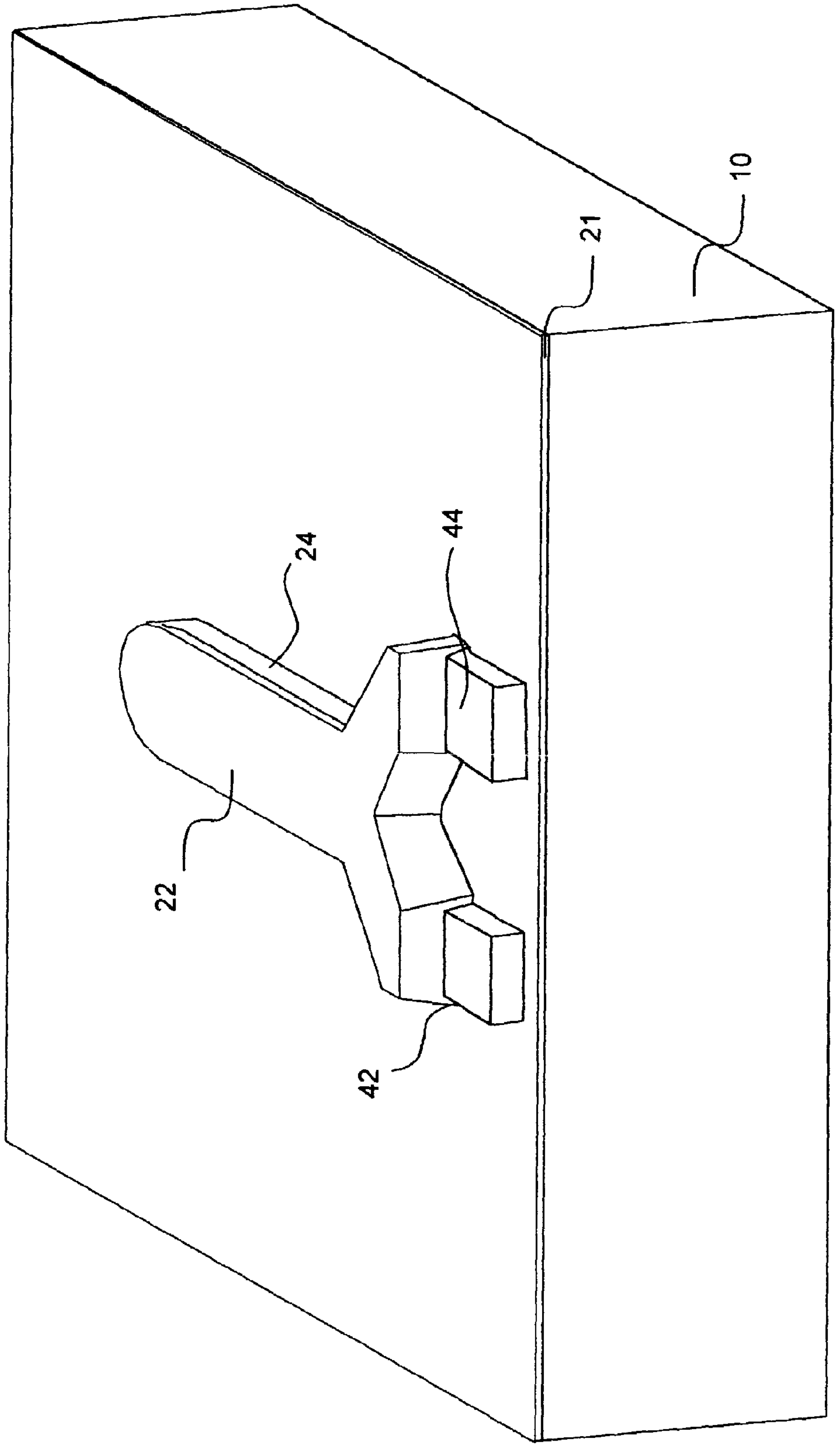
FIG. 6 is a perspective view of a next process stage for some preferred configurations the present invention wherein a barrier layer of a low thermal conductivity material is formed.

FIG. 6 illustrates a barrier layer 22 having been deposited and patterned over the previously formed first layer 24 portion of the thermal actuator. Barrier layer 22 is formed over the first layer 24 covering the remaining resistor pattern. The barrier layer 22 material has low coefficient of thermal conductivity compared to the material of first layer 24. For example, barrier layer 22 may be silicon dioxide, polyimide or some multi-layered lamination of materials or the like. The thermal conductivity, $k_{22}$, of the barrier material is preferably less than 10 W/(m ° K).

Barrier layer 22 is deposited with a thickness of $h_{22}$ selected in consideration of the thermal conductivity of the barrier material to provide a thermal time delay appropriate to the use of the thermal actuator. For example, for use in a drop emitter, the actuator's motion profile is designed to pressurize liquid at the nozzle and maintain the pressure for sufficient time for surface tension and viscous phenomena to affect jet and drop formation. The actuator motion is then allowed to slow and reverse to further contribute to drop formation and to liquid refill of the chamber. The thermal time delay created by barrier layer 22 is important in maintaining and releasing the thermo-mechanical force generated between first layer 24 and second layer 26. The presence of barrier layer 22 allows the use of a second material having high thermal conductivity without prematurely dissipating the thermo-mechanical forces.

Figure 7:
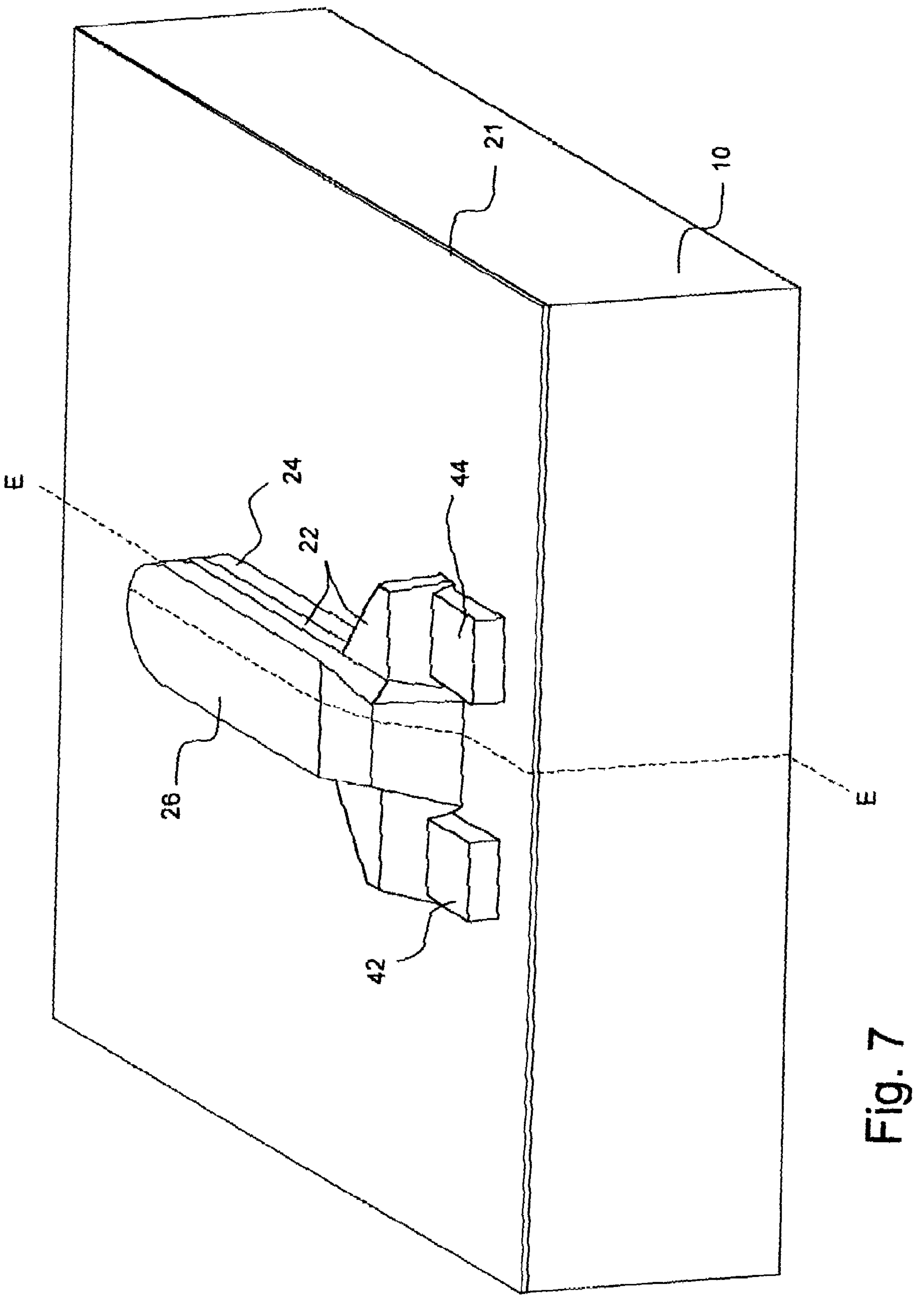
FIG. 7 is a perspective view of a next process stage for some preferred configurations the present invention wherein a second layer of a high thermal conductivity and high Young's modulus material is formed.

FIG. 7 illustrates a second layer 26 having been deposited and patterned over previously formed barrier layer 22 portion of the thermal actuator. The second material used to form second layer 26 has a high thermal conductivity, $k_{26}$, preferably greater than 100 W/(m ° K). In addition, the mechanical performance of the thermal actuator will be substantially improved if the Young's modulus of the second material, $E_{26}$, is high, preferably higher than the Young's modulus of the first material, $E_{24}$. Further, in the practice of the present inventions it is desirable that the Young's modulus of the second material, $E_{26}$, be greater than 200 GPa. For example, second layer 26 may be PECVD silicon carbide, LPCVD silicon carbide, polycrystalline (poly)-diamondor some multi-layered lamination of these materials or the like.

Second layer 26 is formed over barrier layer 22 and brought into good thermal contact with the substrate 10 to create an additional pathway for heat out of the cantilevered element to the substrate. Second layer 26 is deposited with a thickness of $h_{26}$, selected to optimize overall thermo-mechanical performance. The second layer 26 material may have a low coefficient of thermal expansion, $\alpha_{26}$, compared to the material of first layer 24. However, thermal barrier layer 22 has the effect of reducing amount of expansion of second layer 26 during the first one or two heat delaying time constant periods, (1 to 2) $\tau_B$. Consequently, a low value for $\alpha_{26}$ is a less important criterion for the second material than are high values for thermal conductivity, $k_{26}$, and Young's modulus, $E_{26}$.

Additional passivation materials may be applied at this stage over the second layer 26 for chemical and electrical protection. Also, the initial passivation layer 21 is patterned away from areas through which fluid will pass from openings to be etched in substrate 10.

Figure 8:
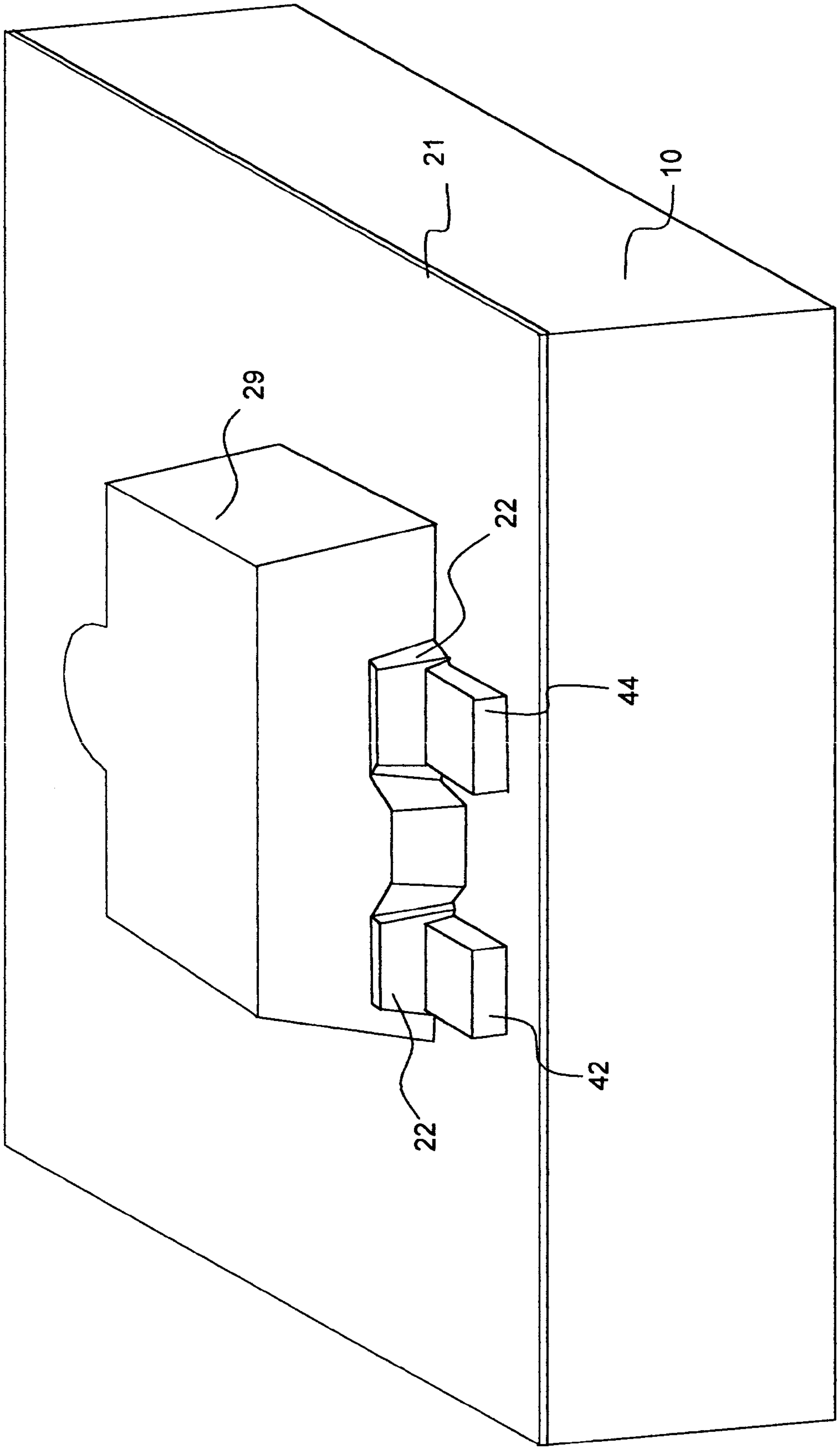
FIG. 8 is a perspective view of the next stages of the process illustrated in FIGS. 5–7 wherein a sacrificial layer in the shape of the liquid filing an upper chamber of a liquid drop emitter according to the present invention is formed.

FIG. 8 shows the addition of a sacrificial layer 29 which is formed into the shape of the interior of a chamber of a liquid drop emitter. A suitable material for this purpose is polyimide. Polyimide is applied to the device substrate in sufficient depth to also planarize the surface that has the topography of the first 24, second 26 and barrier 22 layers as illustrated in FIGS. 5–7. Any material which can be selectively removed with respect to the adjacent materials may be used to construct sacrificial structure 29.

Figure 9:
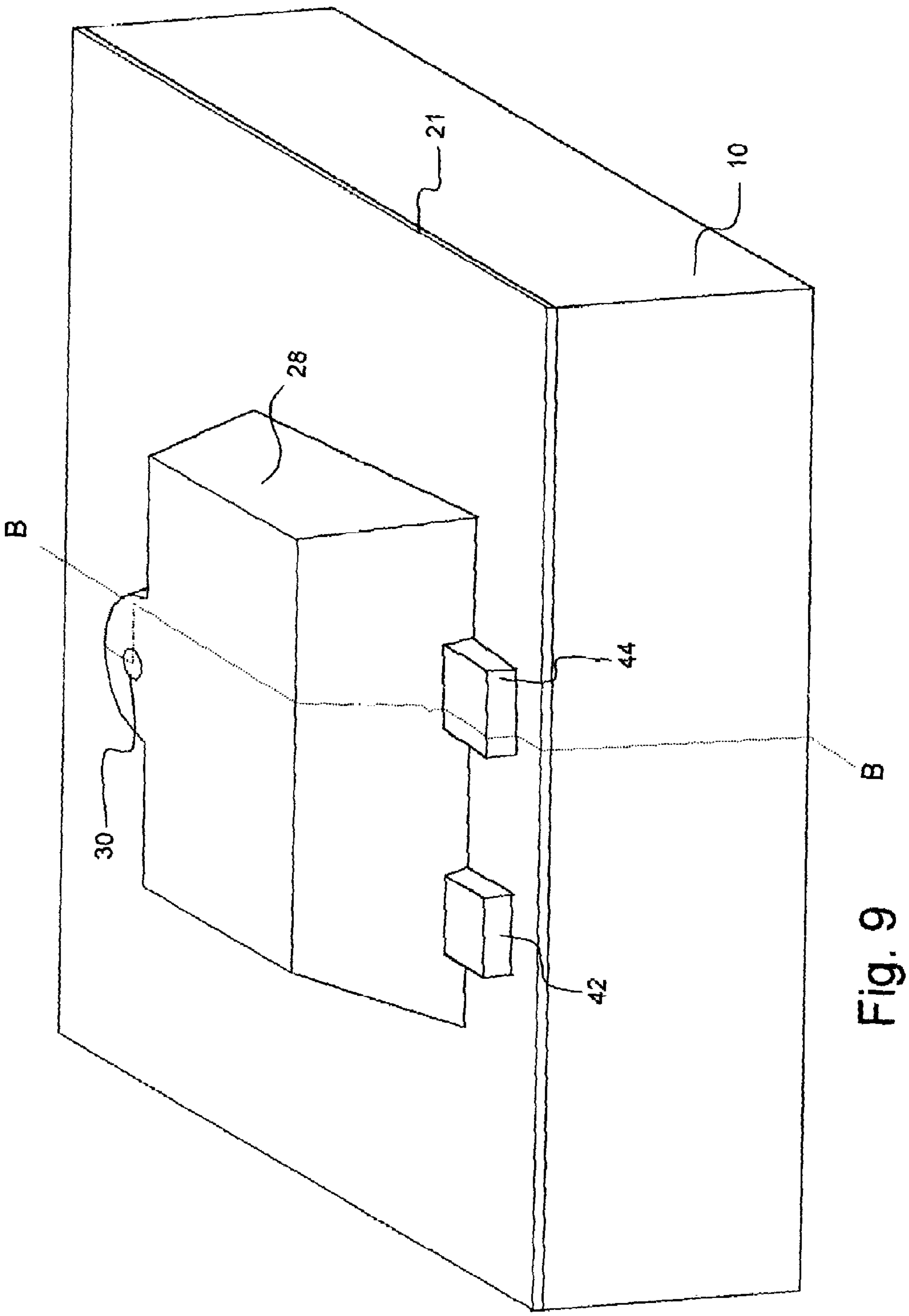
FIG. 9 is a perspective view of the next stages of the process illustrated in FIGS. 5–8 wherein an upper liquid chamber and nozzle of a drop emitter according to the present invention are formed.

FIG. 9 illustrates drop emitter liquid chamber walls and cover formed by depositing a conformal material, such as plasma deposited silicon oxide, nitride, or the like, over the sacrificial layer structure 29. This layer is patterned to form drop emitter chamber 28. Nozzle 30 is formed in the drop emitter chamber, communicating to the sacrificial material layer 29, which remains within the drop emitter chamber 28 at this stage of the fabrication sequence.

Figure 10A:
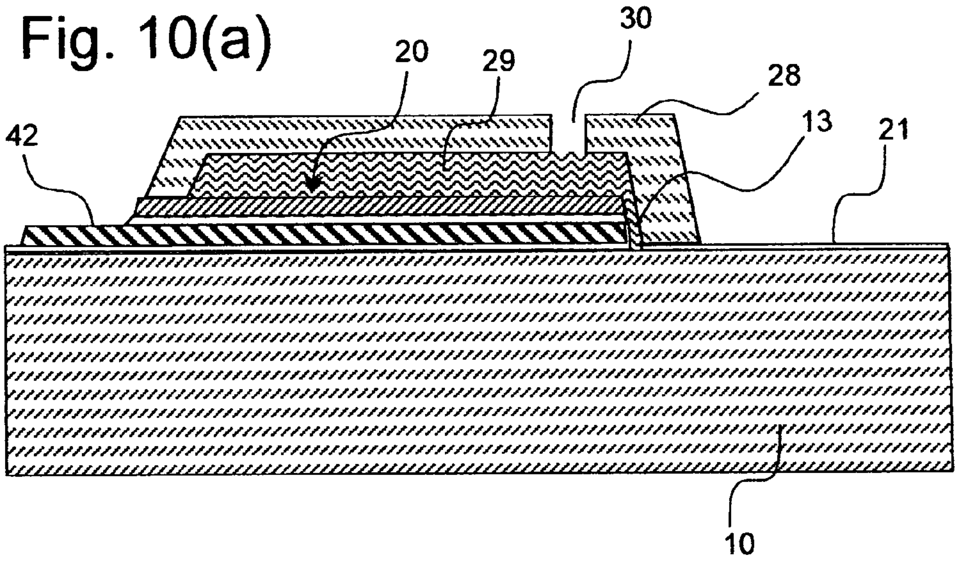
FIGS. 10(*a*)–10(*c*) are side views along line B—B of FIG. 9 of final stages of the process illustrated in FIGS. 5–9 wherein a liquid supply pathway is formed and the sacrificial layer is removed releasing the cantilevered element for movement completing the drop emitter according to the present inventions.

FIGS. 10(*a*)–10(*c*) show side views of the device through a section indicated as B—B in FIG. 9. In FIG. 10(*a*) the sacrificial layer 29 is enclosed within the drop emitter chamber walls 28 except for nozzle opening 30. Also illustrated in FIG. 10(*a*), the substrate 10 is intact. Passivation layer 21 has been removed from the surface of substrate 10 in gap area 13 and around the periphery of the cantilevered element 20. The removal of layer 21 in these locations was done at a fabrication stage before the forming of sacrificial structure 29.

Figure 10B:
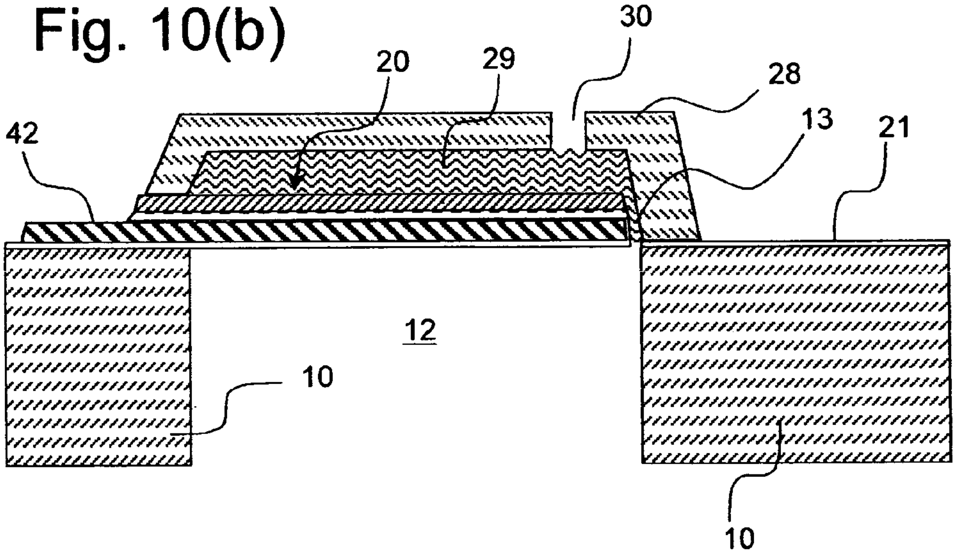

In FIG. 10(b), substrate 10 is removed beneath the cantilever element 20 and the liquid chamber areas around and beside the cantilever element 20. The removal may be done by an anisotropic etching process such as reactive ion etching, or such as orientation dependent etching for the case where the substrate used is single crystal silicon. For constructing a thermal actuator alone, the sacrificial structure and liquid chamber steps are not needed and this step of etching away substrate 10 may be used to release the cantilevered element 20.

Figure 10C:
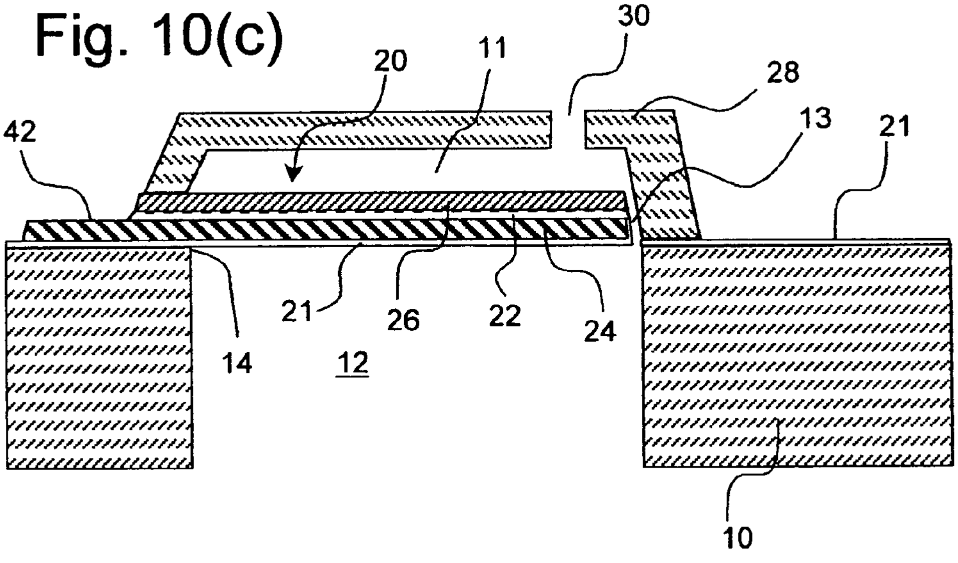

In FIG. 10(c) the sacrificial material layer 29 has been removed by dry etching using oxygen and fluorine sources. The etchant gasses enter via the nozzle 30 and from the newly opened fluid supply chamber area 12, etched previously from the backside of substrate 10. This step releases the cantilevered element 20, completing the liquid drop emitter device.

Figure 11A:
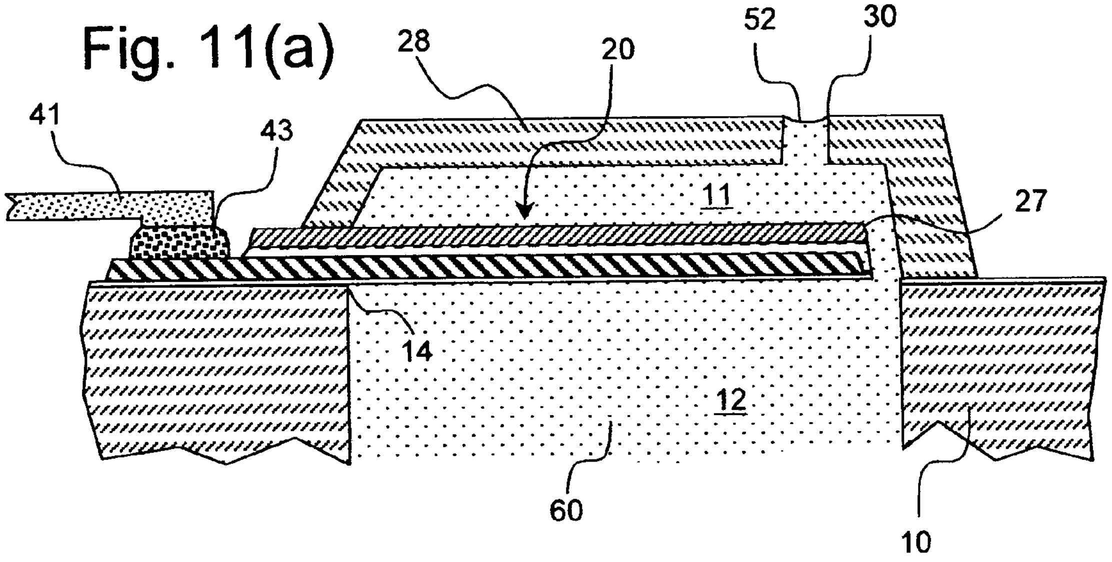
FIGS. 11(*a*) and 11(*b*) are side views side views along line B—B of FIG. 9 illustrating the cantilevered element in a first and second position causing the emission of a drop.
Figure 11B:
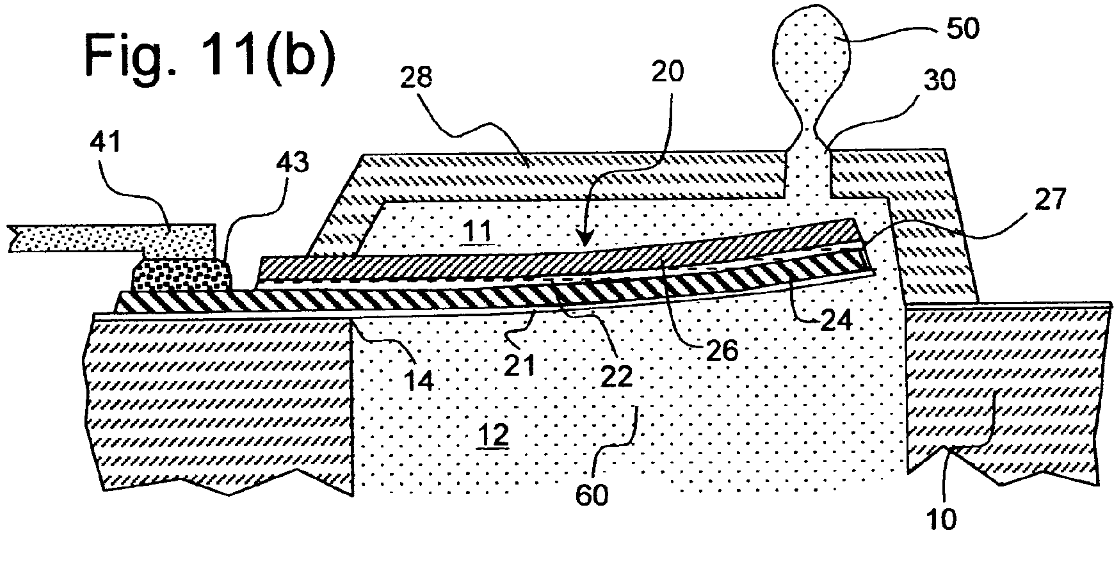

FIGS. 11(a) and 11(b) illustrate side views of a liquid drop emitter structure according to some preferred embodiments of the present invention. FIG. 11(a) shows the cantilevered element 20 in a first position proximate to nozzle 30. FIG. 11(b) illustrates the deflection of the free end 27 of the cantilevered element 20 towards nozzle 30. Rapid deflection of the cantilevered element to this second position pressurizes liquid 60 causing a drop 50 to be emitted.

In an operating emitter of the cantilevered element type illustrated, the quiescent first position may be a partially bent condition of the cantilevered element 20 rather than the horizontal condition illustrated FIG. 11(a). The actuator may be bent upward or downward at room temperature because of internal stresses that remain after one or more microelectronic deposition or curing processes. The device may be operated at an elevated temperature for various purposes, including thermal management design and ink property control. If so, the first position may be as substantially bent as is illustrated in FIG. 11(b).

For the purposes of the description of the present invention herein, the cantilevered element will be said to be quiescent or in its first position when the free end is not significantly changing in deflected position. For ease of understanding, the first position is depicted as horizontal in FIG. 4(a) and FIG. 11(a). However, operation of thermal actuators about a bent first position are known and anticipated by the inventors of the present invention and are fully within the scope of the present inventions.

Figure 12A:
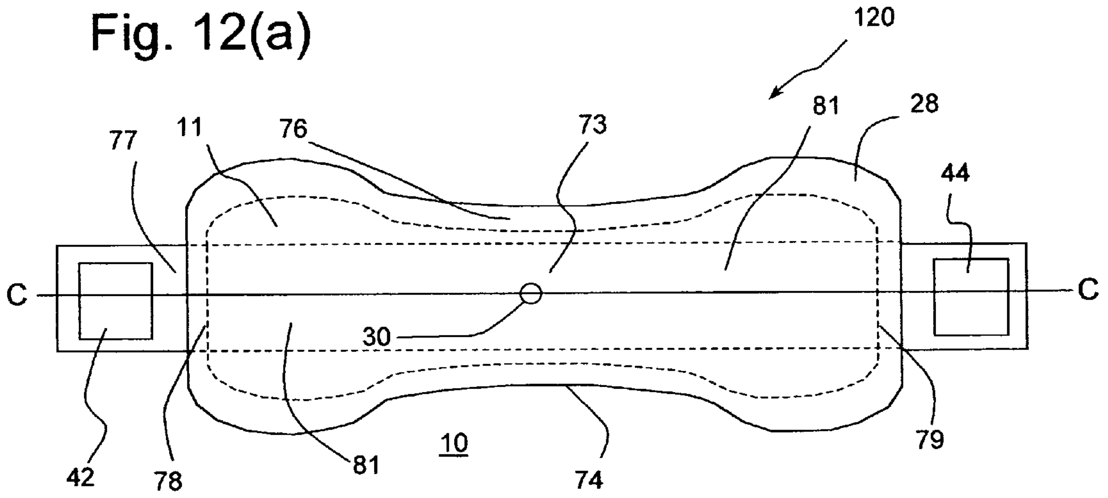
FIGS. 12(*a*) and 12(*b*) are enlarged plan views of an individual ink jet or liquid drop emitter unit based on a clamped beam element thermo-mechanical actuator according to the present invention.
Figure 12B:
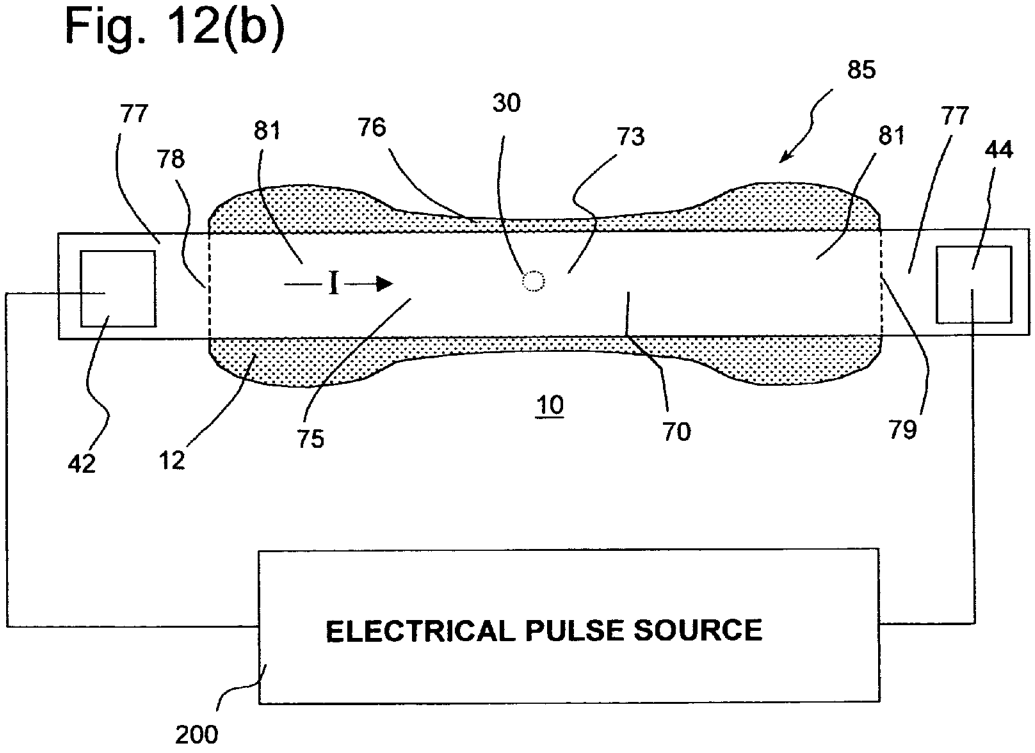

FIGS. 12(a) and 12(b) illustrate a plan view of a single drop emitter unit 120 with and without the liquid chamber cover 28, including nozzle 30, removed. Drop emitter unit 120 utilizes a thermo-mechanical actuator 85 configured as a beam element 70 extending from opposite first and second anchor walls 78, 79 of the chamber 12 and having a central fluid displacement portion 73 that resides in a first position proximate to the nozzle. The beam element has bending portions 81 adjacent the first and second anchor walls 78, 79 that bend when heated. The bending portions 81 are comprised in similar fashion to the cantilevered element discussed herein above of a first layer 24 constructed of a first material having a high coefficient of thermal expansion, a second layer 26 constructed of a material having a low coefficient of thermal expansion and barrier layer 22, constructed of a barrier material having a low thermal conductivity and a low Young's modulus.

The thermal actuator 85 is configured to operate in a snap-through mode. The beam element 70 of the actuator has the shape of a long, thin and wide beam. This shape is merely illustrative of beam elements that can be used. Many other shapes are applicable. For some embodiments of the present invention the deformable element may be a plate which is attached to the base element continuously around its perimeter.

In FIGS. 12(a) and (b) the fluid chamber 12 has a narrowed wall portion at 74 that conforms to the central fluid displacement portion 73 of beam element 70, spaced away to provide clearance 76 for the actuator movement during snap-through deformation. The close positioning of the walls of chamber 12, where the maximum deformation of the snap-through actuator occurs, helps to concentrate the pressure impulse generated to efficiently affect liquid drop emission at the nozzle 30.

FIG. 12(b) illustrates schematically the attachment of electrical pulse source 200 to the electrically resistive heater (coincident with first layer 24 of beam element 70) at heater electrodes 42 and 44. Voltage differences are applied to voltage terminals 42 and 44 to cause resistance heating via the resistor. This is generally indicated by an arrow showing a current I. In the plan views of FIGS. 12(a) and 12(b), the central fluid displacement portion 73 of beam element 70 moves toward the viewer when it is heated and forcefully snaps-through its central plane. Drops are emitted toward the viewer from the nozzle 30 in cover 28. This geometry of actuation and drop emission is called a "roof shooter" in many ink jet disclosures.

Figure 13A:
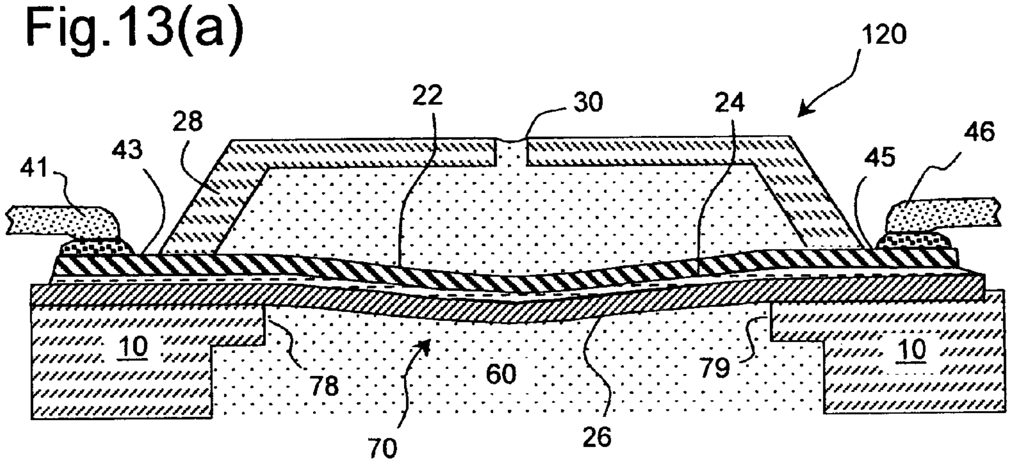
FIGS. 13(*a*) and 13(*b*) are side views formed along the line C—C in FIG. 12(*a*) illustrating first and second positions of the central fluid displacement portion of a beam element thermo-mechanical actuator according to the present invention.
Figure 13B:
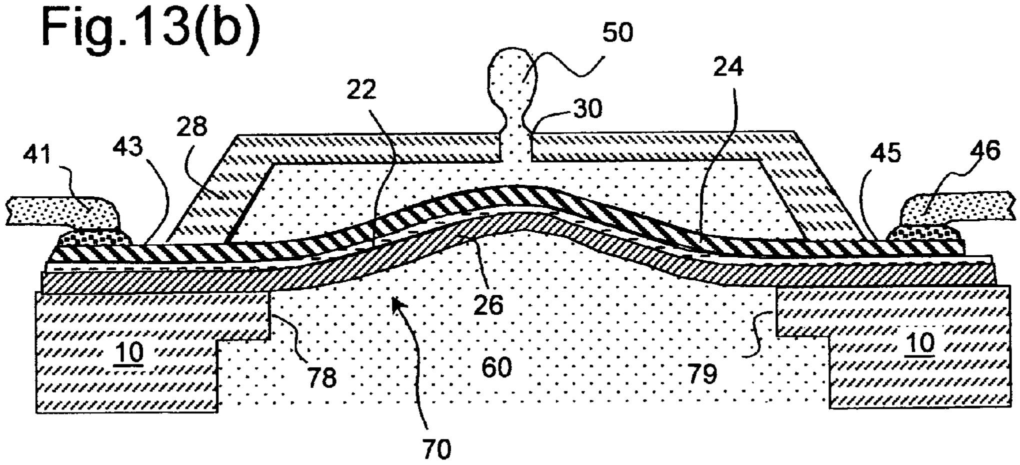

FIGS. 13(a) and 13(b) illustrate in side view a snap-through thermal actuator according to a preferred embodiment of the present invention. The side views in FIGS. 13(a) and (b) are formed along the line C—C in FIG. 12(a). In FIG. 13(a) the beam element 70 is in a first quiescent position having a residual shape bowed downward away from first layer 24. FIG. 13(b) shows the beam element buckled upward to a second position after undergoing snap-through transition through a central plane. Beam element 70 is anchored to substrate 10 which serves as a base element for the snap-through thermal actuator. Beam element 70 is attached to opposing anchor edges 78, 79 of substrate base element 10 using materials and a configuration that results in semi-rigid connections. In FIGS. 13(a) and 13(b), a portion of the base element 10 material has been removed immediately below opposing anchor edges 78, 79 to render the structure at the attachment walls 78, 79 somewhat flexible, i.e. semi-rigid.

Beam element 70 is constructed of at least three layers. First layer 24 is constructed of a first material having a large coefficient of thermal expansion to cause an upward thermal moment and subsequent snap-through buckling when it is thermally elongated with respect to other layers in the deformable element. First layer 24 has a first side which is uppermost and a second side which is lowermost in FIGS. 13(a) and 13(b). Barrier layer 22 is formed on the second, lowermost, side of first layer 24 in order to delay heat transfer to second layer 26. Second layer 26 is attached to barrier layer 22 and is constructed of a material having a high coefficient of thermal conductivity and a large Young's modulus. The thicknesses and Young's moduli of first, second and barrier layers, 24, 26 and 22, and the coefficient of thermal expansion of at least first layer 24, are selected to result in a thermal moment of substantial magnitude over a temperature range that is practical for the device materials and any working fluids involved.

For some high thermal conductivity second materials preferred in the practice of the present invention, for example diamond or silicon carbide, the second layer may have to be deposited on the substrate before the first layer. This may be because high temperatures are required during the deposition or an annealing process that is too high for the first material, for example, $TiAl_3$. An alternative first layer material is nickel, which can withstand higher temperatures. Other layers may be included in the construction of beam element 70. Additional material layers, or sub-layers of first, second and barrier layers, 24, 26 and 22, may be used for thermo-mechanical performance, electrical resistivity, dielectric insulation, chemical protection and passivation, adhesive strength, fabrication cost, light absorption and so on.

A heat pulse is applied to first layer 24, causing it to rise in temperature and elongate. Initially the elongation causes the deformable element to buckle farther in the direction of the residual shape bowing (downward in FIG. 13(*a*)). Second layer 26 elongates in response to the stress applied by first layer 24. Substantial elastic energy is stored in the elongated layers of the beam element. At a sufficiently high temperature, the thermal moment causes the beam element 70 to reverse in a rapid snap-through transition resulting in a deformation, a buckling upward in a direction opposite to the residual shape bowing. The rapid snap-through transition produces a pressure impulse in the liquid at the nozzle 30, causing a drop 50 to be ejected.

Barrier layer 22, constructed of a barrier material having a low thermal conductivity and low Young's modulus, delays the transmission of heat to second layer 26 while the forces which generate the snap-through effect are building within the beam element. A low Young's modulus barrier material is desirable so that barrier layer 22 does not resist the snap through effect and does not overly diminish the magnitude of deflection toward the nozzle that generates drop emission.

When used as actuators in drop emitters, the buckling response of the beam element 70 must be rapid enough to sufficiently pressurize the liquid at the nozzle. Typically, electrically resistive heating apparatus is adapted to apply heat pulses and an electrical pulse duration of less than 10 μsecs is used and, preferably, a duration less than 2 μsecs.

Figure 14A:
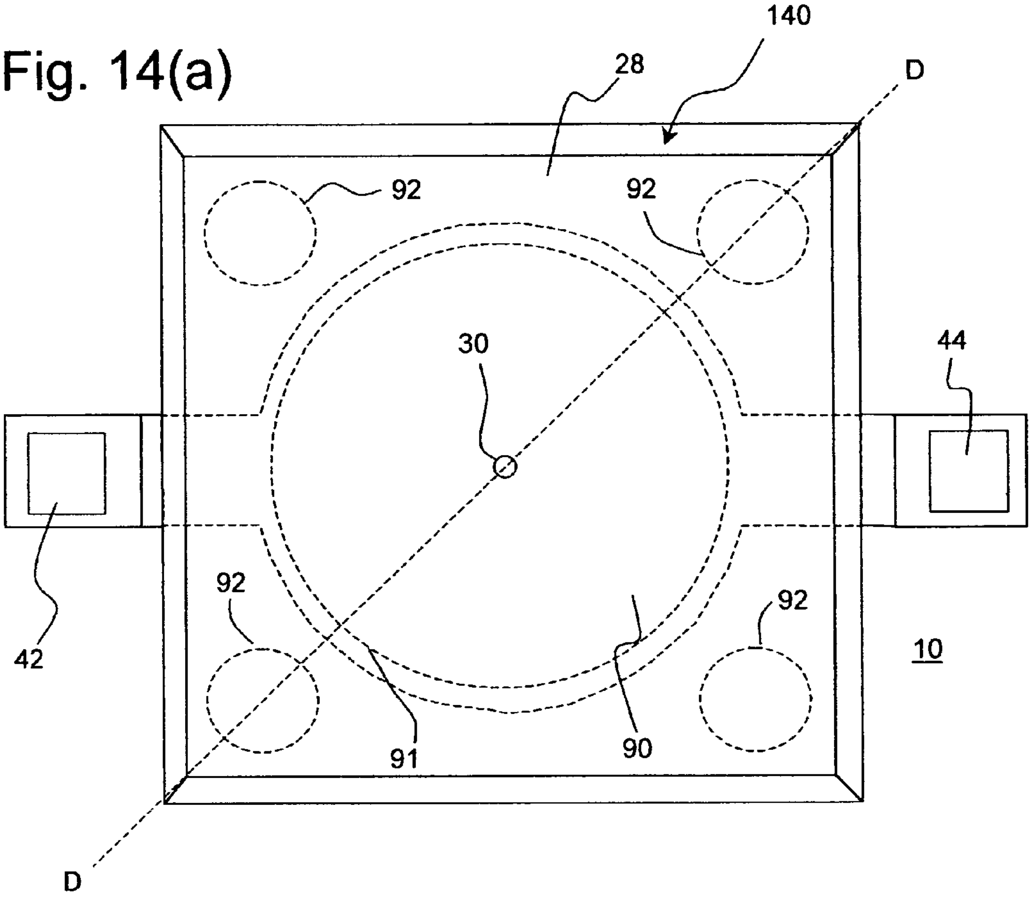
FIGS. 14(*a*) and 14(*b*) are enlarged plan views of an individual ink jet or liquid drop emitter unit based on a clamped plate element thermo-mechanical actuator according to the present invention.
Figure 14B:
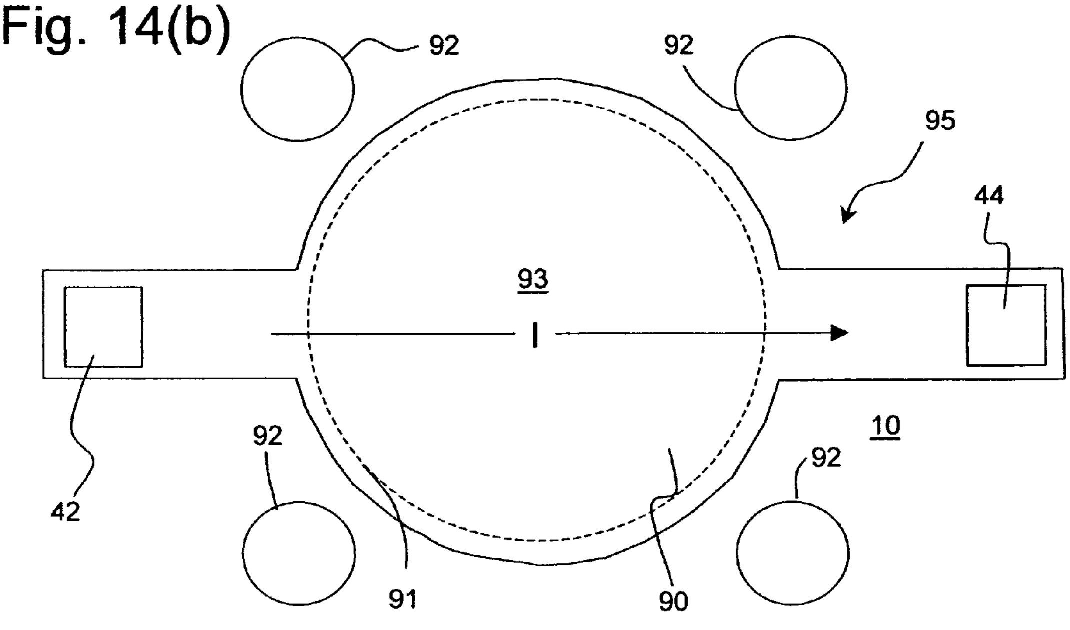

FIGS. 14(*a*) and 14(*b*) illustrate a plan view of a single drop emitter unit 140 with and without the liquid chamber cover 28, including nozzle 30, removed. Drop emitter unit 140 utilizes a thermo-mechanical actuator 95 configured as a plate element 90 extending from an anchor edge periphery 91 of a lower liquid chamber 12 (not shown) and having a central fluid displacement area 93 that resides in a first position proximate to the nozzle. Fluid supply ports 92 provide a path for fluid to enter an upper chamber 11 (not shown) above the plate element 90. The plate element has bending portions adjacent the anchor edge periphery 91 that bend when heated. The bending portions are comprised in similar fashion to the beam element discussed herein above of a first layer 24, a second layer 26 and barrier layer 22.

Figure 15A:
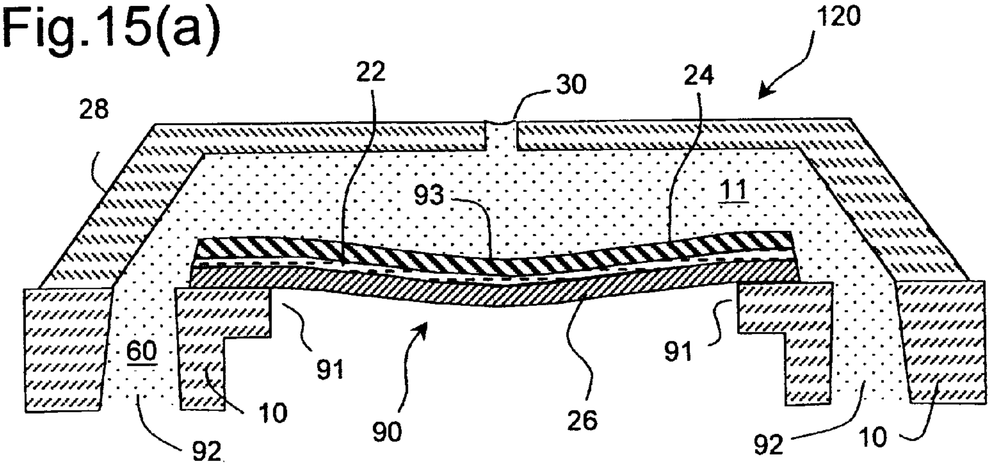
FIGS. 15(*a*) and 15(*b*) are side views formed along the line D—D in FIG. 14(*a*) illustrating first and second positions of the central fluid displacement area of a plate element thermo-mechanical actuator according to the present invention.
Figure 15B:
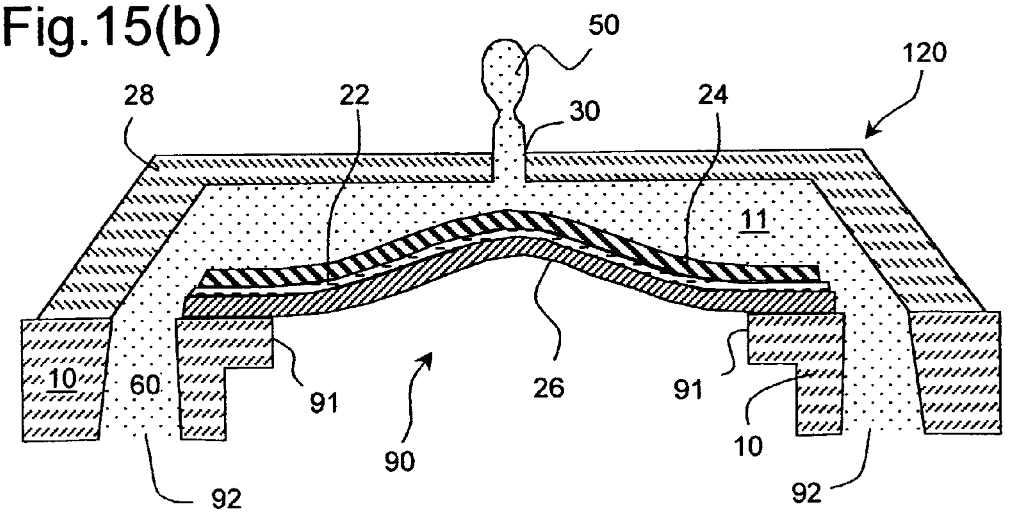

FIGS. 15(*a*) and 15(*b*) illustrate in side view a snap-through thermal actuator according to a preferred embodiment of the present invention. The side views in FIGS. 15(*a*) and (*b*) are formed along the line D—D in FIG. 14(*a*). In FIG. 15(*a*) the plate element 90 is in a first quiescent position having a residual shape bowed downward away from first layer 24. FIG. 15(*b*) shows the plate element buckled upward to a second position after undergoing snap-through transition through a central plane. For the embodiment illustrated fluid is supplied via refill passages 92 around plate element 90. This arrangement allows plate element 90 to be backed by a gas or vacuum, thereby reducing fluid back pressure forces when actuated to emit drops.

Plate element 90 is anchored to substrate 10 that serves as a base element for the snap-through thermal actuator. Plate element 90 is attached to anchor edge periphery 91 of substrate base element 10 using materials and a configuration which results in semi-rigid connections. In FIGS. 15(*a*) and 15(*b*), a portion of the base element 10 material has been removed immediately below anchor edge periphery 91 to render the structure at the attachment walls somewhat flexible, i.e. semi-rigid.

A heat pulse is applied to first layer 24, causing it to rise in temperature and elongate. Initially the elongation causes the deformable element to buckle farther in the direction of the residual shape bowing (downward in FIG. 15(*a*)). Second layer 26 also elongates in response to the stress applied by first layer 24. Substantial elastic energy is stored in the elongated layers of the beam element. At a sufficiently high temperature, the thermal moment causes the plate element 90 to reverse in a rapid snap-through transition resulting in a deformation, a buckling upward in a direction opposite to the residual shape bowing. The rapid snap-through transition produces a pressure impulse in the liquid at the nozzle 30, causing a drop 50 to be ejected.

Figure 16:
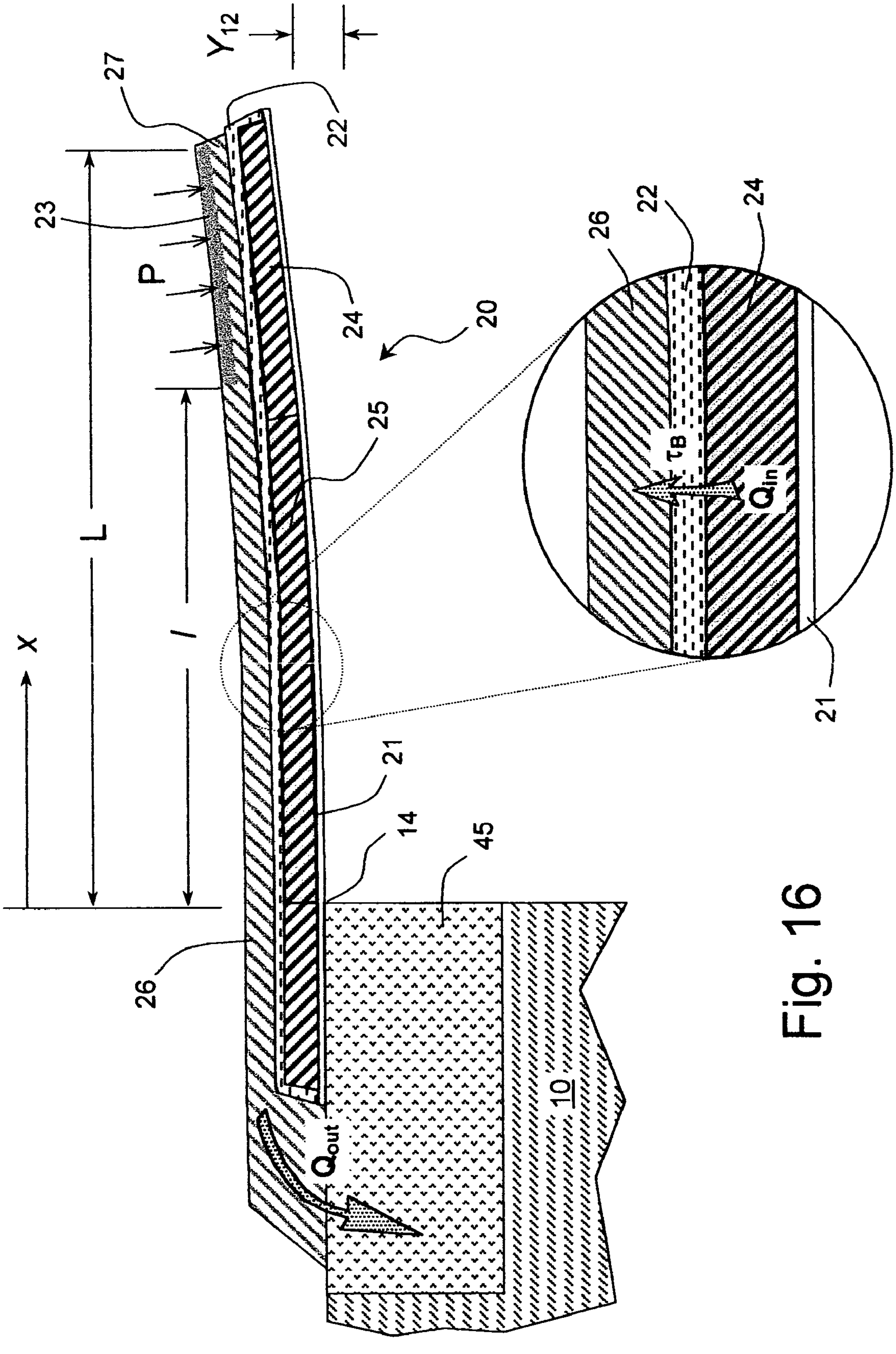
FIG. 16 is a side view of a cantilevered element thermal actuator under working load back pressure according to the present inventions.

FIG. 16 illustrates a multi-layer cantilevered element 20 that will be analyzed to further understand the preferred properties of the second material according to the present inventions. The side view of FIG. 16 is taken along the center of a cantilever as illustrated by line E—E in FIG. 7 above. Electrode contacts 42, 44 are not seen in this sectional view. Cantilever 20 has a length L measured from anchor edge 14 to free end 27. When deflected from a quiescent first position to an activated second position, the free end 27 deflects upward an amount $Y_{12}$. Cantilevered element 20 works against a load, for example fluid mass and back pressure, that is illustrated as a constant pressure P impinging the free end 27 and pressing downward. For purposes of understanding the present inventions, the working load is assumed simply to be applied uniformly over the end portion (L−l) of the cantilever. Hence, a working load $W_L=(L-l)P$ per unit width of cantilever 20 is applied. This simplified analysis represents the part of cantilever 20 that substantially moves through the working liquid or impinges some other load, for example the closing contact of a switch.

First layer 24 is constructed of a first material having a high coefficient of thermal expansion. In addition, the first material is electrically resistive and formed into a heater resistor 25 so that the application of electrical pulses directly heats first layer 24. Barrier layer 22 is constructed of a material having a low thermal conductivity and a low Young's modulus. The thickness of barrier layer 22 is selected to provide a desired heat transfer time constant $\tau_B$ governing heat transfer to second layer 26. This function of barrier layer 22 is schematically illustrated by an arrow labeled $\tau_B$ showing the input heat energy $Q_{in}$ flowing from first layer 24 to second layer 26 through barrier layer 22 with a time constant of $\tau_B$.

For efficient operation of thermal actuators according to the present invention, the heat $Q_{in}$, applied to first layer 24, is preferably introduced in a pulse time, $\tau_p$, less than $\tau_B$, and, most preferably in a time less than $\frac{1}{2}\tau_B$. In practice the input heat energy pulse time, $\tau_p$, is selected to achieve proper timing of drop formation or other physical effects to be accomplished by the actuator. Thus the barrier heat transfer time delay, $\tau_B$, is then designed to hold off heat transfer for an appropriate time, preferably then, $\tau_B>2\tau_p$.

The primary role of second layer 26 is to provide a stiff backing to the cantilever, restraining the expansion of heated first layer 24 so that the thermal moment is forceful and the actuator bends in a direction perpendicular to its elongation direction. For this purpose a large Young's modulus is desirable for the second material so that the thickness $h_{26}$ of second layer 26 need not be large, easing fabrication difficulties.

The inventors of the present inventions have found that a high value of thermal conductivity is also very desirable for the second material. An important limitation in operating thermal actuators at high repetition frequencies is the time required for heat to transfer out of the thermal actuator after an actuation event so that a base temperature is restored and the actuator relaxes to the first position. If a high thermal conductivity material is used for the second layer, then this material can be brought into good thermal contact with the substrate, providing an additional pathway for heat to be conducted away from the moveable element. This process is illustrated in FIG. 16 by the arrow labeled $Q_{out}$ indicating the flow of heat out of second layer 26 down into a heat sink portion 45 of substrate 10.

A passivation layer 21, illustrated in FIG. 16, may be desirable for purposes of chemical or electrical isolation of first layer 24, or for fabrication reasons The inventors of the present inventions have calculated some important thermo-mechanical responses of thermal actuators constructed according to the present inventions. Results of these calculations are plotted in FIGS. 17–19. A cantilevered element thermal actuator 20, as illustrated in FIG. 16 and having parameters as described above, was used to calculate the plots of the coefficients of thermal moment, c, and the deflected shape of a cantilever against a working load, a pressure P, applied to the free end. A rectangular cantilevered element having an extended length, L=110 μm was assumed for the calculations. For simplicity of analysis, a heater resistor portion 25 of first layer 24 was configured to heat the full 110 μm length, rather than the partial length illustrated as heater resistor 25 in FIG. 16. An energy pulse was applied sufficient to raise the temperature of first layer 24 by 200° K above a base temperature. A working load back pressure of 2.5 atmospheres ($P=-2.5\times10^5$ Pa) was applied to the last 35 μm of the cantilever i.e., l=75 μm.

Figure 17:
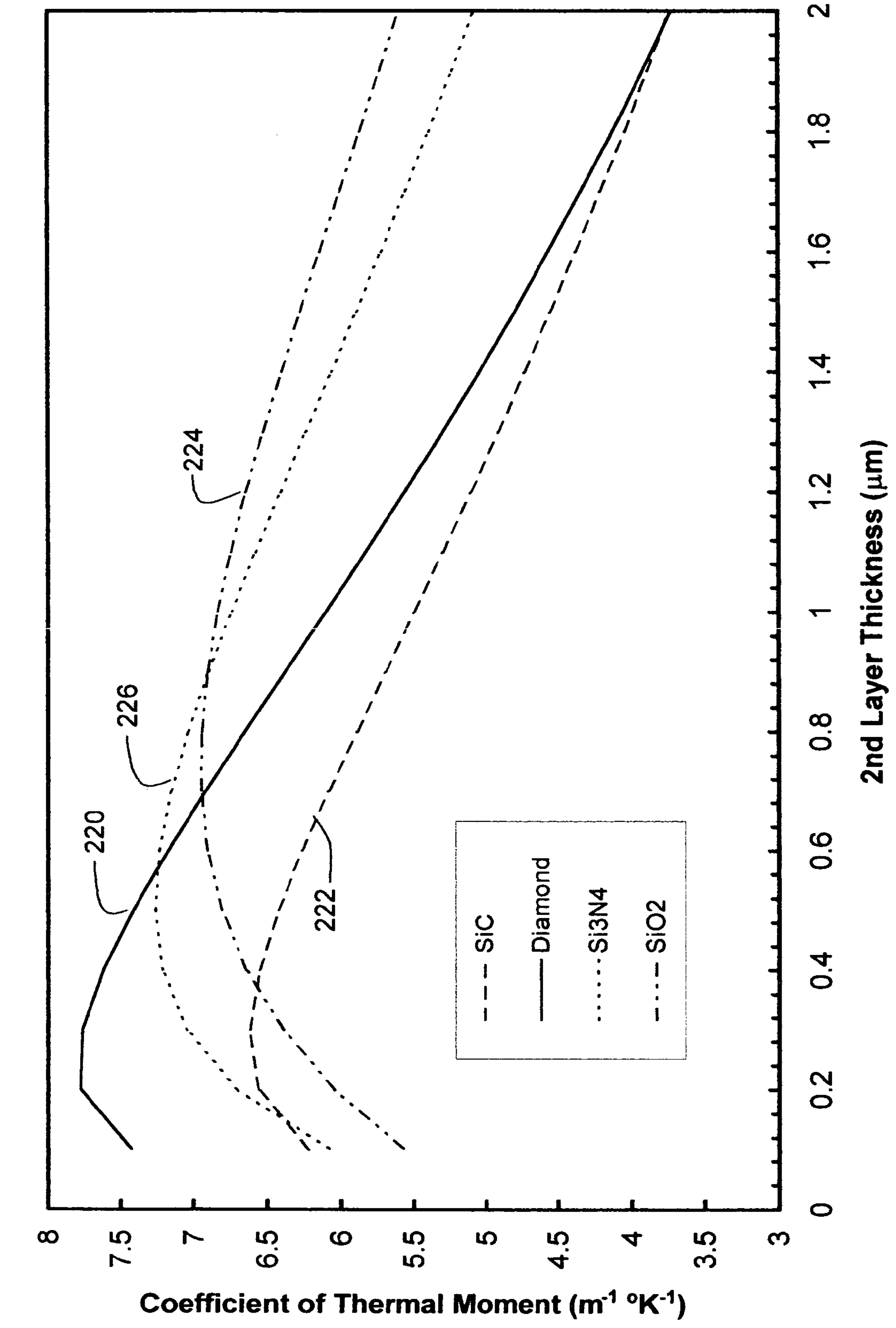
FIG. 17 shows calculated plots of the coefficient of thermal moment for thermo-mechanical actuators having different second materials for purposes of understanding the present inventions.
Figure 18:
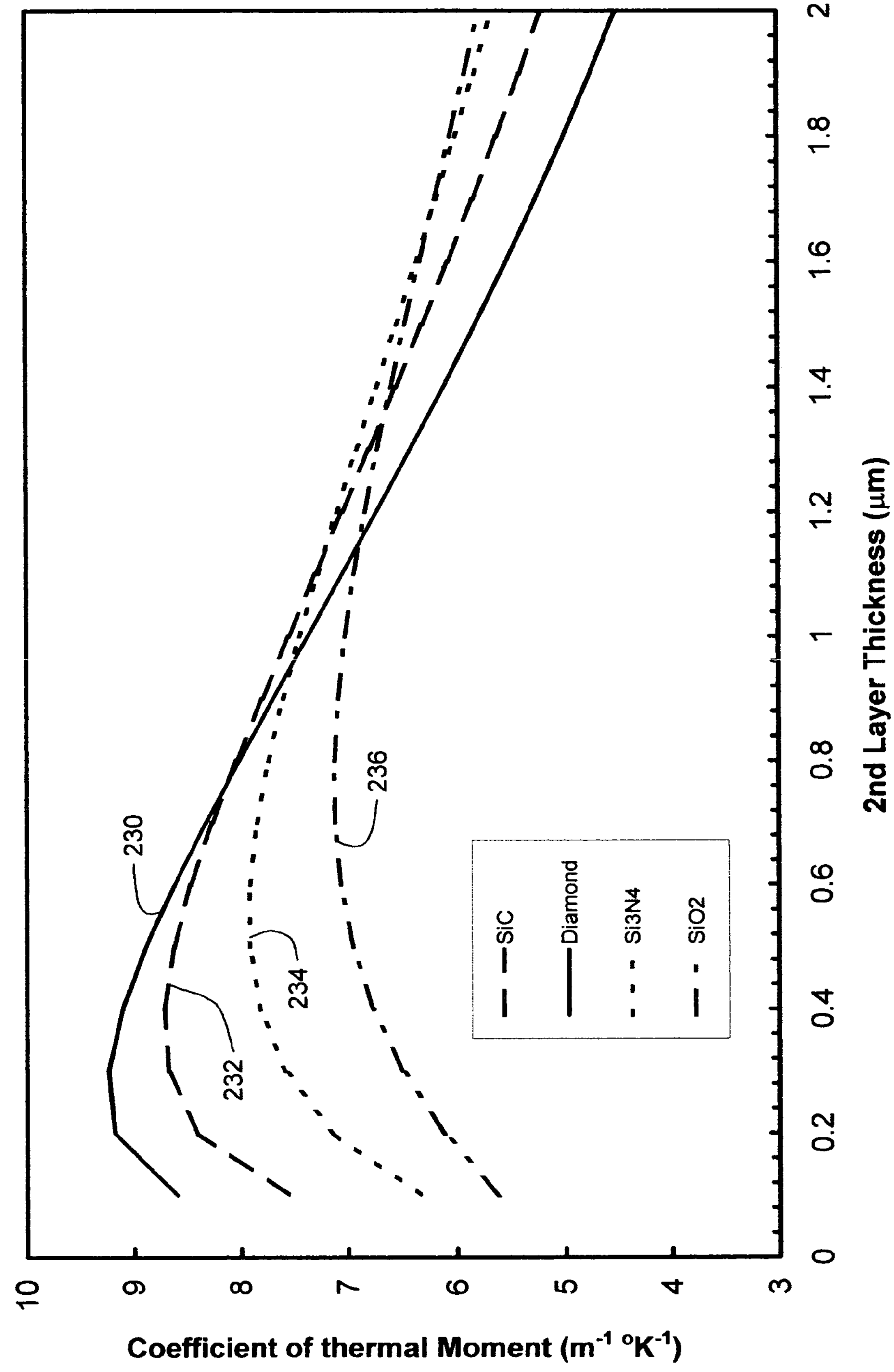
FIG. 18 shows calculated plots of the coefficient of thermal moment, assuming time-delayed heating of the second layer, for thermo-mechanical actuators having different second materials for purposes of understanding the present inventions.
Figure 19:
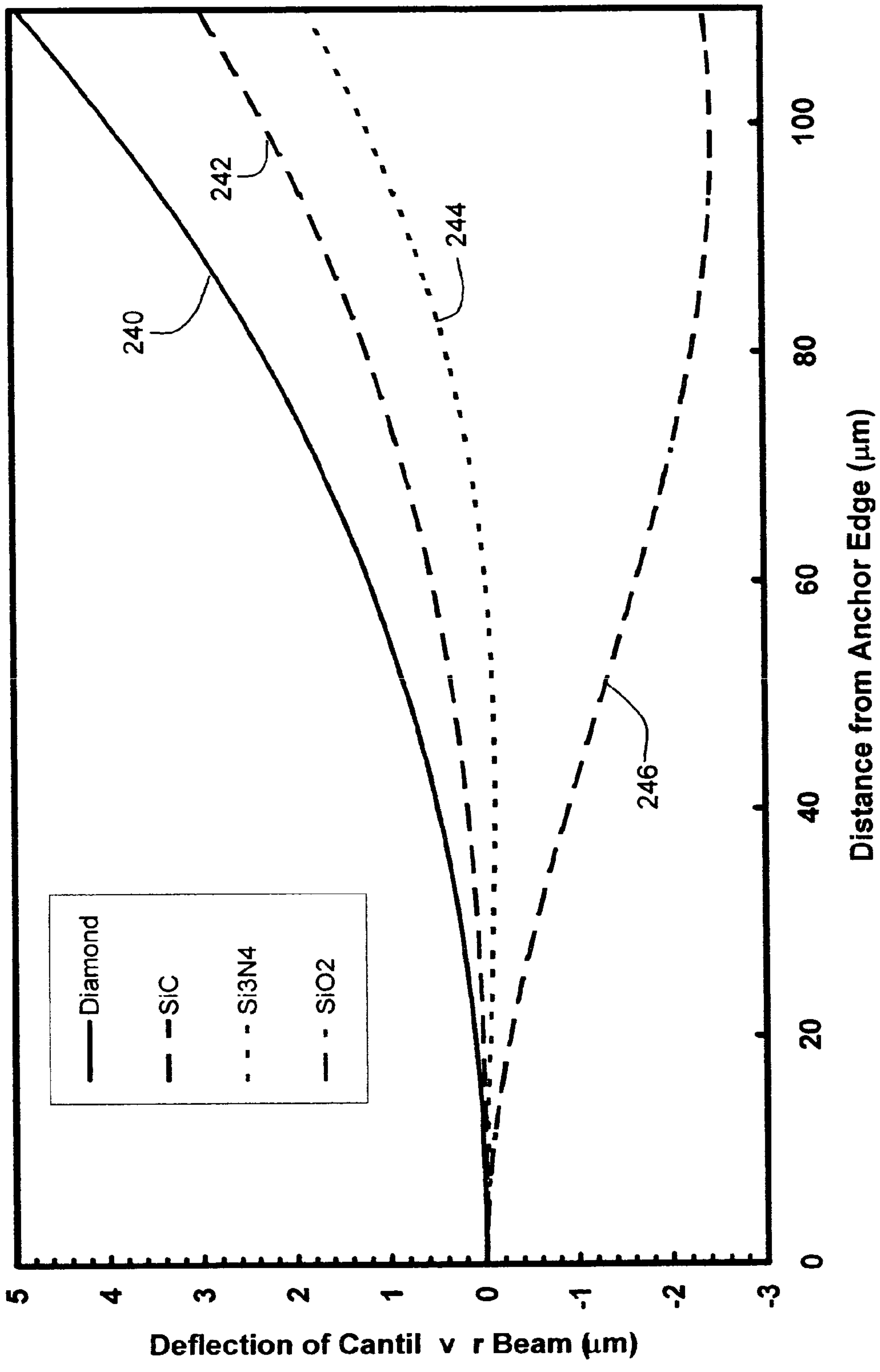
FIG. 19 shows calculated plots of the displacement versus position along a cantilevered element thermal actuator having different second materials for purposes of understanding the present inventions.

For all of the calculations illustrated in FIGS. 17–19 the cantilevered element 20 layers were constructed of materials having property values assumed as given in Table 1. The calculations are focused on effects of different choices for the second material using the same choices for first layer 24 and barrier layer 26. For all calculations illustrated, the parameters of first layer 24 were: $TiAl_3$ material, $h_{24}$=1.5 μm. The parameters of barrier layer 22 were: $SiO_2$ material, $h_{22}$=0.5 μm.

TABLE 1

| Material | E, Young's modulus (GPa) | k, thermal conductivity (W/(m ° K)) | α, TCE ($10^{-6}$) | ρ, density ($Kg/m^3$) | σ, Poisson's ratio |
|---|---|---|---|---|---|
| $TiAl_3$ | 188 | 40* | 15.5 | 3320 | 0.34 |
| polyimide | 2.5–9 | .12–0.3 | 20–55 | 1420 | 0.34 |
| $SiO_2$ | 74 | 1.1 | 0.5 | 2200 | 0.17 |
| $Si_3N_4$ | 170 | 30 | 1.55 | 3100 | 0.24 |
| (PECVD) SiC | 320 | 150 | 4.2 | 3200 | 0.24 |
| 3C—SiC | 450 | 500 | 4.2 | 3200 | 0.24 |
| Polycrystalline diamond | 1000 | 1300 | 2.6 | 3500 | 0.2 |
| Au, gold | 79 | 300 | 14 | 19200 | 0.42 |

*estimated from k values for Ti and Al individually.

The plasma deposited (PECVD) silicon carbide is deposited using a mixed frequency plasma enhanced chemical vapor deposition system at a pressure of 2 Torr and a temperature of 350–400 degrees C. using silane and methane source gases. The polycrystalline 3C-silicon carbide (SiC) is deposited using low pressure chemical vapor deposition at a temperature of 700–800 degrees C. The preferred embodiment is the 3C—SiC unless a lower temperature process is required. Therefore 3C—SiC will be used in the examples below.

The somewhat complex effect of materials properties, layer thicknesses and positions on the thermo-mechanical behavior of a multi-layered thermal actuator may be explored by calculating the coefficient of the thermal moment, c. The coefficient of thermal moment, c, captures the combined effects of these parameters in a two-dimensional multi-layered beam in thermal equilibrium at an elevated temperature. It is assumed that at a base temperature the beam is flat, all of the layers having the same lengths and balanced internal stresses.

Using the concept of the coefficient of thermal moment, c, for the case of a cantilevered element thermal actuator such as that illustrated in FIG. 16, the deflection, $Y_{12}$, of the free end in thermal equilibrium is given approximately by Equation 1:

$$Y_{12} \approx c\Delta T\frac{L^2}{2}, \tag{1}$$

where $Y_{12}$ is the deflection distance from a first position at a base temperature to a second position at an elevated temperature, ΔT is the temperature increase above the base temperature, L is the length of the cantilevered element 20, and c ΔT is termed the "thermal moment".

For a given cantilever length and temperature increase, the differences in deflection, $Y_{12}$, that will occur for multi-layered cantilevered elements of various designs, is captured by c, the coefficient of thermal moment. The following equations define the coefficient of thermal moment for a long and relatively thin beam constructed of laminations of different materials.

$$c = \frac{3\sum_{j=1}^{N}\frac{E_j(y_j^2 - y_{j-1}^2)(\alpha - \alpha_j)}{1-\sigma_j}}{2\sum_{j=1}^{N}\frac{E_j[(y_j - y_c)^3 - (y_{j-1} - y_c)^3]}{1-\sigma_j}}, \tag{2}$$

where

-continued $$\alpha = \frac{\sum_{j=1}^{N} \frac{\alpha_j E_j h_j}{1-\sigma_j}}{\sum_{j=1}^{N} \frac{E_j h_j}{1-\sigma_j}}, \tag{3}$$

and $$y_0 = 0,\ \ y_j = \sum_{k=1}^{N} h_k,\ \ y_c = \frac{\sum_{j=1}^{N} \frac{1}{2} \frac{E_j(y_j^2 - y_{j-1}^2)}{1-\sigma_j^2}}{\sum_{j=1}^{N} \frac{E_j h_j}{1-\sigma_j^2}}. \tag{4}$$

The parameters j, in Equations 2–4 refer to the j layers, in order, in a multi-layer beam being analyzed. For the configuration of FIG. 16, omitting the passivation layer 21 as being thermo-mechanically un-important, three layer beam (N=3) as j layers thus: j=1, first layer 24, $h_1=h_{24}=1.5$ μm of $TiAl_3$; j=2, barrier layer 22, $h_2=h_{22}=0.5$ μm of $SiO_2$; j=3, second layer 26 constructed of various third materials having various thicknesses, $h_3=h_{26}$. $\alpha_j$, $E_j$, $h_j$, and $\sigma_j$ are the coefficients of thermal expansion (CTE), the Young's modulus, the thickness, and the Poisson's ratio for the jth layer, respectively. α is the effective coefficient of thermal expansion for the multi-layer beam as a whole. $y_c$ is the position of the mechanical center line of the bending bean.

The primary influence of second layer 26 in the coefficient of thermal moment, c, is through its thickness $h_3=h_{26}$ and Young's modulus $E_3=E_{26}$. Equations 2–4 were evaluated to calculate c, for second material choices: polycrystalline diamond 3C-silicon carbide (SiC), silicon nitride ($Si_3N_4$), and silicon dioxide ($SiO_2$). For the choice of $SiO_2$, wherein the second material was the same as the barrier material, the second layer was treated in Equations 2–4 as if it were a different material forming a tri-layer structure, although the resulting structure would appear to be a bi-layer of $SiO_2$ and $TiAl_3$.

FIG. 17 shows plots of the coefficient of thermal moment as a function of second layer 26 thickness $h_3=h_{26}$, for tri-layer beams having the above mentioned choices for the second material. The "poly-diamond beam" c is plotted as curve 220, the "3C—SiC beam" c as curve 222, the "$Si_3N_4$ beam" c as curve 224 and the "$SiO_2$ beam" c as curve 226. The plots in FIG. 17 assume that the multi-layer beam has reached thermal equilibrium. Under this condition it is seen that the poly-diamond beam can have the highest value of thermal moment when formed relatively thin, i.e. $h_{26}<0.5$ μm, compared to the choices of first layer and barrier layer parameters calculated. The larger the value of c, the larger will be the deflection $Y_{12}$ for a given cantilever length L and temperature increase ΔT.

The 3C—SiC beam does not develop a coefficient of thermal moment as large as those of the $Si_3N_4$ or $SiO_2$ beams except for a very thin layer. It is desirable to use a high thermal conductivity material such as 3C—SiC for the benefit of thermal recovery after actuation as previously discussed. A study of the parameters of the materials in Table 1 will help to understand the FIG. 17 calculation results for c. As may be seen, the coefficients of thermal expansion (CTE), $\alpha_3=\alpha_{26}$, for the second material choices involved are substantially smaller than for first material $TiAl_3$. However, they are not negligible.

The CTE for 3C—SiC is $4.2\times10^{-6}$ ° $K^{-1}$, compared to $15.5\times10^{-6}$ ° $K^{-1}$ for $TiAl_3$. This means that, in thermal equilibrium, the 3C—SiC layer, combined with having a very high Young's modulus, E=450 GPa, will tend to counteract the elongation of the $TiAl_3$ layer, reducing the coefficient of thermal moment. On the other hand, the $SiO_2$ material has a very low CTE, $0.5\times10^{-6}$ ° $K^{-1}$, and a much lower Young's modulus, E=74 GPa. Consequently the expansion of the $SiO_2$ layer, in thermal equilibrium, does not reduce c in the manner of 3C—SiC. $Si_3N_4$ has a low CTE value, $1.55\times10^{-6}$ ° $K^{-1}$, and a Young's modulus, E=170 GPa, that is comparable to that of $TiAl_3$, E=188 GPa. This combination of parameters results in larger values of c for a silicon nitride second layer than for a silicon carbide second layer, over a practical thickness range of $h_{26}>0.2$ μm.

If it were not for the benefits of heat dissipation that can be achieved using a high thermal conductivity, high Young's modulus second material, the calculated results for c shown in FIG. 17 indicate that $Si_3N_4$ would be the optimum choice for the material of the second layer. However, the thermal conductivity of $Si_3N_4$, k=30 W/(m ° K), is over an order of magnitude less than that of poly-diamond, k=1300 W/(m ° K), or 3C—SiC, k=500 W/(m ° K). Therefore the heat dissipation contribution of a silicon nitride second layer would be over an order of magnitude less than what could be achieved using a diamond or silicon carbide layer.

The equilibrium analysis of c, using Equations 2–4, ignores the thermal time delay introduced by the use of barrier layer 22 formed of a low thermal conductivity material, for this example, $SiO_2$ having k=1.1 W/(m ° K). The deflection of the cantilever will occur under a condition wherein first layer 24, the $TiAl_3$ layer, has been heated to a temperature of ΔT, however the second layer has not yet been substantially heated until at least one thermal time constant of the barrier layer, $\tau_B$. A simple dynamic analysis of this situation may be done by assuming that the CTE values of the second material are zero during a short time $t<\sim\tau_B$. Values for the coefficient of thermal moment for the second materials being compared were re-calculated assuming $\alpha_3=0$ for all choices.

FIG. 18 shows plots of the coefficient of thermal moment as a function of second layer 26 thickness $h_3=h_{26}$, for tri-layer beams having the above mentioned choices for the second material, and $\alpha_3=0$ for all. The poly-diamond beam c is plotted as curve 230, the 3C—SiC beam c as curve 232, the $Si_3N_4$ beam c as curve 234 and the $SiO_2$ beam c as curve 236. Under the short time frame condition, it is seen that the poly-diamond beam can have the highest value of thermal moment when formed with a thickness $h_{26}<0.8$ μm, compared to the choices of first layer and barrier layer parameters calculated. However, the 3C—SiC beam now also performs better than the $Si_3N_4$ or $SiO_2$ beams for a thickness $h_{26}<1.0$ μm.

Thus it may be understood from the calculated results shown in FIG. 18, that high thermal conductivity, high Young's modulus materials may be used to practice the present inventions, even though they may have significant values of CTE. The use of barrier layer 22 allows the favorable contribution to the thermal moment indicated to be realized during a short time sufficient for drop-on-demand drop emitters or other short duration actuations. Then, subsequently, over a longer time frame, the benefits of heat dissipation via the highly thermally conductive second layer brought into good thermal contact with the substrate may also be realized to increase the repetition frequency of actuation.

A further understanding of the beneficial use of high Young's modulus materials for the second layer may be seen by including the effects of a working load on the deflection of a thermal actuator. The cantilevered element 20 in FIG. 16 will deflect an amount f(x) under the influence of working load, pressure P, pushing down and a thermal moment c $\Delta T$, pushing up. The differential equation governing the equilibrium cantilever shape f(x) as a function of x, the distance from anchor edge 14, is given in Equation 5:

$$\frac{\partial^4 f}{\partial x^4} = \begin{cases} 0, & 0 \le x \le l \\ \frac{P}{D}, & l \le x \le L \end{cases} \tag{5}$$

The applicable boundary conditions are:

$$f\big|_{x=0} = 0,\ \frac{\partial f}{\partial x}\bigg|_{x=0} = 0,\ \frac{\partial^2 f}{\partial x^2}\bigg|_{x=L} = c\Delta T,\ \frac{\partial^3 f}{\partial x^3}\bigg|_{x=L} = 0; \tag{6}$$

and the discontinuity conditions are:

$$f^-\big|_{x=l} = f^+\big|_{x=l},\ \frac{\partial f^-}{\partial x}\bigg|_{x=l} = \frac{\partial f^+}{\partial x}\bigg|_{x=l}, \tag{7}$$
$$\frac{\partial^2 f^-}{\partial x^2}\bigg|_{x=l} = \frac{\partial^2 f^+}{\partial x^2}\bigg|_{x=l},\ \frac{\partial^3 f^-}{\partial x^3}\bigg|_{x=l} = \frac{\partial^3 f^+}{\partial x^3}\bigg|_{x=l}$$

The solution to Equations 5–7 is:

$$f(x) = \begin{cases} -\frac{P}{D}(L-l)\frac{x^3}{3!} + \left[\frac{P}{D}\frac{(L^2-l^2)}{2!} + c\Delta T\right]\frac{x^2}{2!}, & 0 \le x \le l \\ \frac{P}{D}\frac{(x-l)^4}{4!} - \frac{P}{D}(L-l)\frac{x^3}{3!} + \left[\frac{P}{D}\frac{(L^2-l^2)}{2!} + c\Delta T\right]\frac{x^2}{2!}, & l \le x \le L \end{cases} \tag{8}$$

where the multilayer flexural rigidity coefficient, D, is given by:

$$D = \frac{1}{3}\sum_{j=1}^{N}\left[(y_j - y_c)^3 - (y_{j-1} - y_c)^3\right]\frac{E_j}{1-\sigma_j^2}. \tag{9}$$

The deflection $Y_{12}$=f(L) of the free end 27 of cantilever 20 is described by:

$$f(L) = \frac{P}{D}\left[\frac{(L-l)^4}{4!} - (L-l)\frac{L^3}{3!} + \frac{(L^2-l^2)}{2!}\frac{L^2}{2!}\right] + \frac{c\Delta T}{2}L^2 \tag{10}$$
$$= \frac{P}{24D}(3L^4 - 4Ll^3 + l^4) + \frac{c\Delta T}{2}L^2$$

The shape of the cantilevered element 20 is given by Equation 8 as a function of x, the distance from anchor wall edge 14. Equation 8 is plotted in FIG. 19 for the four beam configurations plotted in FIGS. 17 and 18. The calculations plotted in FIG. 19 were done using the values for the coefficient of thermal moment, c, given in FIG. 17, i.e., including the effects of the CTE's for the various materials. The thickness of second layer 26 was $h_3=h_{26}=0.8$ μm and the working load pressure was P=2.5 atm (~0.25 MPa) for all four calculations shown. The materials properties are as noted in Table 1.

In FIG. 19 the poly-diamond beam shape is plotted as curve 240, the 3C—SiC beam shape as curve 242, the $Si_3N_4$ beam shape as curve 244 and the $SiO_2$ beam shape as curve 246. The poly-diamond beam shows substantially more free end deflection at x=L (110 mm) then any of the other materials. Hence the diamond material beam is the most effective in achieving thermo-mechanical actuation for this given set of cantilever layer thicknesses. The 3C—SiC beam is similarly more deflected than the $Si_3N_4$ or the $SiO_2$ beams. In fact, the $SiO_2$ beam is not stiff enough to withstand the applied back pressure P and bends down. The calculations plotted in FIG. 19 show the benefit of using high Young's modulus materials for the second layer.

If the short time frame values of the coefficient of thermal moment (FIG. 18) were used to evaluate Equation 8, the advantages of the diamond and silicon carbide material over silicon nitride and silicon dioxide would be even more pronounced.

The above calculational results demonstrate the effectiveness of using high Young's modulus materials for the second layer. Further, the superior heat dissipation of high thermal conductivity materials may be used advantageously to hasten actuator reset times by incorporating a thermal barrier layer of a low thermal conductivity material to delay heat diffusion for a period of time sufficient for the actuated physical process, for example drop emission. Silicon carbide and diamond like carbon films are especially preferred materials for the practice of the present inventions. A combination of titanium aluminide for the first layer, silicon dioxide for the barrier layer and silicon carbide or diamond for the second layer are preferred combinations for practicing the present inventions.

While much of the foregoing description was directed to the configuration and operation of a single drop emitter, it should be understood that the present invention is applicable to forming arrays and assemblies of multiple drop emitter units. Also it should be understood that thermal actuator devices according to the present invention may be fabricated concurrently with other electronic components and circuits, or formed on the same substrate before or after the fabrication of electronic components and circuits.

From the foregoing, it will be seen that this invention is one well adapted to obtain all of the ends and objects. The foregoing description of preferred embodiments of the invention has been presented for purposes of illustration and description. It is not intended to be exhaustive or to limit the invention to the precise form disclosed. Modification and variations are possible and will be recognized by one skilled in the art in light of the above teachings. Such additional embodiments fall within the spirit and scope of the appended claims.

PARTS LIST

10 substrate
11 upper liquid chamber
12 lower liquid chamber
13 gap between moveable element and chamber wall
14 cantilevered element anchor location
15 thermal actuator with a cantilevered element 20

16 lower liquid chamber curved wall portion
17 anchored portion of cantilevered element 20
20 cantilevered element
21 passivation layer
22 barrier layer
23 area of working load back pressure on the movable element
24 first layer
25 resistor portion of first layer 24
26 second layer
27 free end portion of cantilevered element
28 upper liquid chamber structure, walls and top cover
29 sacrificial layer
30 nozzle
41 TAB lead
42 electrical input pad
43 solder bump
44 electrical input pad
45 heat sink portion
50 drop
52 liquid meniscus
60 working liquid
62 first resistor segment
64 second resistor segment
66 current coupling segment
70 beam element
71 bending portion
72 lengthwise axis
73 central fluid displacement portion
74 narrowed central portion of the lower liquid chamber
75 simple linear resistor formed in first layer
76 gap between beam element 70 and chamber walls
78 first anchor wall
79 second anchor wall
80 support substrate
85 thermal actuator with a beam element 70
90 plate element
91 anchor edge periphery
92 fluid supply inlet
93 central area of the plate element
95 thermal actuator with a plate element 90
110 drop emitter unit having a cantilevered thermo-mechanical actuator 15
120 drop emitter unit having a beam thermo-mechanical actuator 85
140 drop emitter unit having a plate thermo-mechanical actuator 95
200 electrical pulse source
300 controller
400 image data source
500 receiver

What is claimed is:

1. A thermal actuator for a micro-electromechanical device comprising:

(a) a base element;

(b) a movable element extending from the base element and residing at a first position, the movable element including a barrier layer constructed of a barrier material having low thermal conductivity material, bonded between a first layer and a second layer; wherein the first layer is constructed of a first material having a high coefficient of thermal expansion and the second layer is constructed of a second material different than the first material and having a high thermal conductivity and a high Young's modulus, and wherein the thermal conductivity of the second material is substantially greater than the thermal conductivity of the first material; and (c) apparatus adapted to apply a heat pulse directly to the first layer, causing a thermal expansion of the first layer relative to the second layer and deflection of the movable element to a second position, followed by relaxation of the movable element towards the first position as heat diffuses through the baffler layer to the second layer.

2. The thermal actuator of claim 1 wherein the Young's modulus of the second material is substantially greater than the Young's modulus of the first material.

3. The thermal actuator of claim 1 wherein the coefficient of thermal expansion of the second material is substantially smaller than the coefficient of thermal expansion of the first material.

4. The thermal actuator of claim 1 wherein the second material is a silicon carbide material.

5. The thermal actuator of claim 1 wherein the second material is a diamond material.

6. The thermal actuator of claim 1 wherein the barrier material is a silicon oxide material.

7. The thermal actuator of claim 1 wherein the heat pulse has a time duration of $\tau_P$, the barrier layer has a heat transfer time constant of $\tau_B$, and $\tau_B > 2\tau_P$.

8. The thermal actuator of claim 1 wherein the base element further includes a heat sink portion and the first layer and the second layer are brought into good thermal contact with the heat sink portion.

9. The thermal actuator of claim 1 wherein the movable element is a cantilever extending from an anchor edge on the substrate.

10. The thermal actuator of claim 1 wherein the movable element is a beam element extending from and anchored at opposite first and second anchor edges on the substrate.

11. The thermal actuator of claim 1 wherein the second layer is formed on the substrate before the first layer is formed.

12. A thermal actuator for a micro-electromechanical device comprising:

(a) a base element;

(b) a movable element extending from the base element and residing at a first position, the movable element including a barrier layer constructed of a barrier material having low thermal conductivity material, bonded between a first layer and a second layer; wherein the first layer is constructed of an electrically resistive first material having a high coefficient of thermal expansion and the second layer is constructed of a second material different than the first material and having a high thermal conductivity and a high Young's modulus, and wherein the thermal conductivity of the second material is substantially greater than the thermal conductivity of the first material; and (c) a pair of electrodes connected to the first layer to apply an electrical pulse to cause resistive heating of the first layer, resulting in a thermal expansion of the first layer relative to the second layer and deflection of the movable element to a second position, followed by relaxation of the movable element towards the first position as heat diffuses through the barrier layer to the second layer.

13. The thermal actuator of claim 12 wherein the Young's modulus of the second material is substantially greater than the Young's modulus of the first material.

14. The thermal actuator of claim 12 wherein the coefficient of thermal expansion of the second material is substantially smaller than the coefficient of thermal expansion of the first material.

15. The thermal actuator of claim 12 wherein the second material is a silicon carbide material.

16. The thermal actuator of claim 12 wherein the second material is a diamond material.

17. The thermal actuator of claim 12 wherein the barrier material is a silicon oxide material.

18. The thermal actuator of claim 12 wherein the first material is a titanium aluminide material.

19. The thermal actuator of claim 12 wherein the first material is a titanium aluminide material and the second material is a diamond or silicon carbide material.

20. The thermal actuator of claim 12 wherein the heat pulse has a time duration of $\tau_P$, the barrier layer has a heat transfer time constant of $\tau_B$, and $\tau_B > 2\tau_P$.

21. The thermal actuator of claim 12 wherein the base element further includes a heat sink portion and the first layer and the second layer are brought into good thermal contact with the heat sink portion.

22. The thermal actuator of claim 12 wherein the movable element is a cantilever extending from an anchor edge on the substrate.

23. The thermal actuator of claim 12 wherein the movable element is a beam element extending from and anchored at opposite first and second anchor edges on the substrate.

24. The thermal actuator of claim 12 wherein the second layer is formed on the substrate before the first layer is formed.

25. A liquid drop emitter comprising:

(a) a chamber, formed in a substrate, filled with a liquid and having a nozzle for emitting drops of the liquid;

(b) a thermal actuator having a movable element extending from at least one wall of the chamber and having a fluid displacement portion residing at a first position proximate to the nozzle, the movable element including a barrier layer constructed of a barrier material having low thermal conductivity material, bonded between a first layer and a second layer; wherein the first layer is constructed of an electrically resistive first material having a high coefficient of thermal expansion and the second layer is constructed of a second material different than the first material and having a high thermal conductivity and a high Young's modulus, and wherein the thermal conductivity of the second material is substantially greater than the thermal conductivity of the first material; and (c) a pair of electrodes connected to the first layer to apply an electrical pulse to cause resistive heating of the first layer, causing a thermal expansion of the deflector layer relative to the restorer layer and rapid deflection of the moveable element, ejecting liquid at the nozzle, followed by relaxation of the movable element towards the first position as heat diffuses through the barrier layer to the second layer.

26. The liquid drop emitter of 25 wherein the liquid drop emitter is a drop-on-demand ink jet printhead and the liquid is an ink for printing image data.

27. The liquid drop emitter of 25 wherein the Young's modulus of the second material is substantially greater than the Young's modulus of the first material.

28. The liquid drop emitter of 25 wherein the coefficient of thermal expansion of the second material is substantially smaller than the coefficient of thermal expansion of the first material.

29. The liquid drop emitter of 25 wherein the second material is a silicon carbide material.

30. The liquid drop emitter of 25 wherein the second material is a diamond material.

31. The liquid drop emitter of 25 wherein the barrier material is a silicon oxide material.

32. The liquid drop emitter of 25 wherein the first material is a titanium aluminide material.

33. The liquid drop emitter of claim 32 wherein the second material is a diamond or silicon carbide material.

34. The liquid drop emitter of claim 25 wherein the heat pulse has a time duration of $\tau_P$, the barrier layer has a heat transfer time constant of $\tau_B$, and $\tau_B > 2\tau_P$.

35. The liquid drop emitter of 25 wherein the base element further includes a heat sink portion and the first layer and the second layer are brought into good thermal contact with the heat sink portion.

36. The liquid drop emitter of 25 wherein the movable element is a cantilever and the fluid displacement portion is a free end of the cantilever.

37. The liquid drop emitter of 25 wherein the movable element is a beam element extending from and anchored at opposite first and second walls of the chamber and the fluid displacement portion is a central area of the beam element.

38. The liquid drop emitter of 25 wherein the movable element is a plate element forming at least a portion of a wall of the chamber and the fluid displacement portion is a central area of the plate element.

39. The liquid drop emitter of 25 wherein the second layer is formed on the substrate before the first layer is formed.

* * * * *